(12) United States Patent
Ikari et al.

(10) Patent No.: US 7,174,594 B2
(45) Date of Patent: Feb. 13, 2007

(54) CAR WASHING MACHINE

(75) Inventors: Akira Ikari, Shiga (JP); Nobuhiro Ishida, Shiga (JP); Nobuhiko Kawai, Shiga (JP); Katsuya Kitanaka, Shiga (JP); Takehiro Yamada, Shiga (JP)

(73) Assignee: Daifuku Co., Ltd., Osaka (JP)

( * ) Notice: Subject to any disclaimer, the term of this patent is extended or adjusted under 35 U.S.C. 154(b) by 371 days.

(21) Appl. No.: 10/109,367

(22) Filed: Mar. 28, 2002

(65) Prior Publication Data

US 2002/0144366 A1     Oct. 10, 2002

(30) Foreign Application Priority Data

Apr. 9, 2001 (JP) .............................. 2001-109386
Nov. 26, 2001 (JP) .............................. 2001-358611

(51) Int. Cl.
*B60S 3/06* (2006.01)

(52) U.S. Cl. ..................... 15/53.1; 15/53.2; 15/DIG. 2; 134/123

(58) Field of Classification Search ................ 15/53.1, 15/53.2, DIG. 2, 97.3; 134/32, 123
See application file for complete search history.

(56) References Cited

U.S. PATENT DOCUMENTS 3,590,417 A    7/1971  Emanuel ................... 15/302
4,587,688 A *  5/1986  Gougoulas ................ 15/316.1
5,103,413 A *  4/1992  Ohata ........................ 702/96
5,432,974 A *  7/1995  Yasutake et al. .......... 15/316.1
5,577,288 A * 11/1996  Stinnett et al. ............ 15/97.3
5,901,398 A *  5/1999  Ishikawa et al. .......... 15/53.3
6,193,808 B1 * 2/2001  Decker ......................... 134/6

FOREIGN PATENT DOCUMENTS

AT     PS 312 435        10/1969
DE     298 16 527         3/2000
EP     0 987 156 A2       3/2000

* cited by examiner

*Primary Examiner*—Mark Spisich
(74) *Attorney, Agent, or Firm*—Kusner & Jaffe

(57) ABSTRACT

A car washing machine (1) is composed of a front body (1A) provided with a rocker brush (11), a top brush (12), side brushes (13) and so forth as washing means for washing a vehicle (2), and a rear body (1B) provided with a top nozzle (21), side nozzles (22) and so forth as drying means for drying the vehicle (2). The front and rear bodies (1A and 1B) are capable of separately traveling. According to this arrangement, the washing operation of the vehicle (2) using the washing means provided on the front body (1A) and the drying operation using the drying means provided on the rear body (1B) can be executed in a spaced apart relationship, thus preventing the drying finish from being deteriorated by water splashes produced during the washing operation.

6 Claims, 24 Drawing Sheets

[FIRST OPERATION]
FIG. 11a
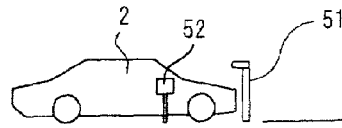
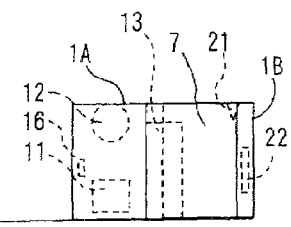
FIG. 11b
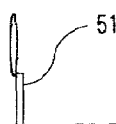
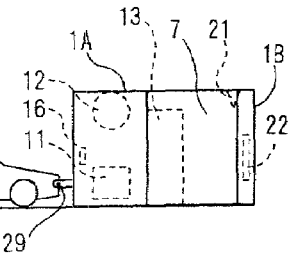
FIG. 11c
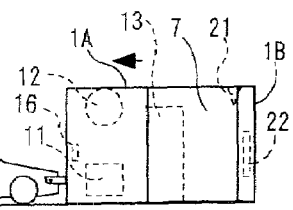
FIG. 11d
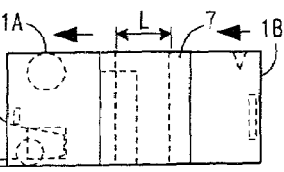
FIG. 11e
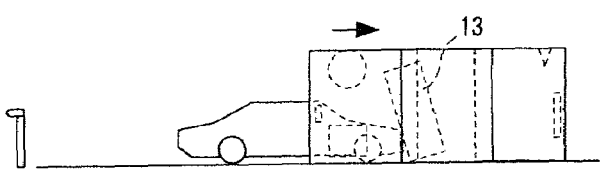
FIG. 11f
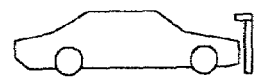
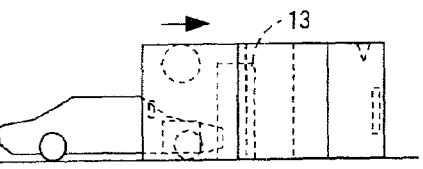
FIG. 11g
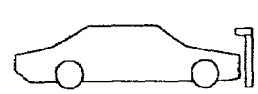
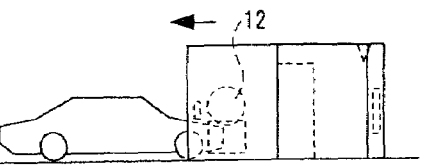
FIG. 11h
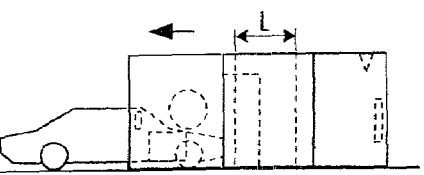

[SECOND OPERATION]

[THIRD OPERATION]

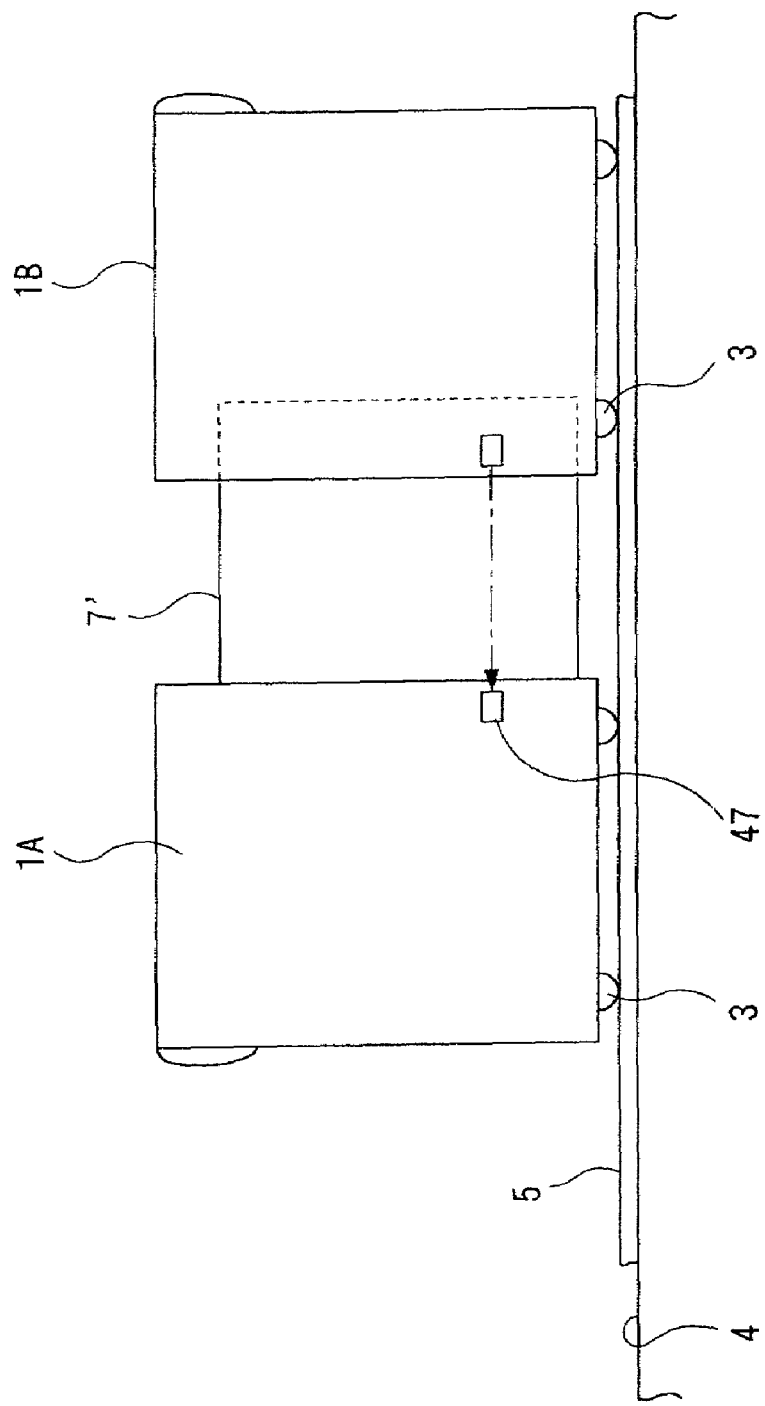

CAR WASHING MACHINE

FIELD OF THE INVENTION

The present invention relates to a car washing machine of a drive-through type (a car washing machine of a type in which a vehicle to be washed enters a car washing machine from the front and after completion of washing, the vehicle leaves it from the rear) installed, for example, in service stations and used for washing cars.

BACKGROUND OF THE INVENTION

A publicly known car washing machine, as disclosed, for example, in U.S. Pat. No. 5,901,398, comprises a stationary type car washing machine, and a conveyor device for conveying a vehicle to be washed from the front through the car washing machine to the rear.

The car washing machine is internally formed with a washing section, a waxing section and a drying section, arranged from front to rear in this order. The washing section is provided with washing brushes for washing the surface of the vehicle, a spray device for spraying washing water and a detergent on the surface of the vehicle, etc. The waxing section is provided with a spray device for spraying a waxing liquid on the surface of the vehicle, and waxing brushes, etc. And the drying section is provided with drying nozzles for blowing air against the surface of the vehicle for drying, etc.

According to the above arrangement, a vehicle to be washed is carried into the car washing machine by the conveyor device. While the vehicle is being conveyed by the conveyor device, first, in the washing section, the washing brushes are activated and washing water and a detergent liquid are sprayed from the spray device to wash the surface of the vehicle. The vehicle is conveyed downstream to the waxing section, where the waxing brushes are activated and a waxing liquid is sprayed from the spray device to be applied to the surface of the vehicle. The vehicle is conveyed further downward to the drying section, where the drying nozzles are activated to dry the surface of the vehicle, which is then carried from the downstream end of the roller conveyor out through the rear of the car washing machine.

There is a need for a car washing machine which is the same as the publicly known car washing machine described above except that it is devoid of the waxing section, that is, a car washing machine which is designed to perform only the washing and drying of a vehicle, not performing application of a waxing liquid, so that it is simple in construction and reduced in cost. Trying to provide such car washing machine devoid of the waxing section offers the following problems.

The washing section and the drying section adjoin each other, with the distance therebetween being short. And since drying is performed by the drying nozzles of the drying section also during the time the washing of the surface of a vehicle is performed by the washing brushes of the washing section, splashes of water produced by the brushing of the vehicle using the washing brushes and by the spraying of washing water and the detergent liquid reach the drying section, causing the problem that satisfactory drying cannot be attained.

Thus, if the distance between the washing section and the drying section is increased, the length of the car washing machine increases, requiring an additional space, which, in turn, requires enlarging the installation space for the car washing machine, making it difficult to install the same in a filling station, for example.

DISCLOSURE OF THE INVENTION

Accordingly, an object of the invention is to provide a car washing machine which solves these problems and which does not require enlarging the installation space for the car washing machine and is capable of satisfactory drying.

To achieve this object, the invention provides a car washing machine adapted to wash a vehicle while relatively moving the vehicle and the car washing machine, characterized in that the car washing machine is constructed by being separated into a front body and a rear body which are capable of separately traveling, the front body being provided with a washing means for washing the vehicle, the rear body being provided with a drying means for drying the vehicle.

With such arrangement, the front and rear bodies separately travel, thus allowing the distance between the washing means now performing washing and the drying means now performing drying to be maximized so as to prevent the drying from being hindered by splashes of water caused by washing, thus ensuring satisfactory drying all the time.

BRIEF DESCRIPTION OF THE DRAWINGS

FIGS. 11a–11h, 12i–12p, and 13q–13s are explanatory views showing the procedures, in order of occurrence, involved in the ordinary "first operation" control method for the car washing machine;

FIG. 21 is a schematic side view of a car washing machine according to another embodiment of the invention;

DESCRIPTION OF THE EMBODIMENTS

An embodiment of the invention will now be described with reference to the drawings.

Figure 1:
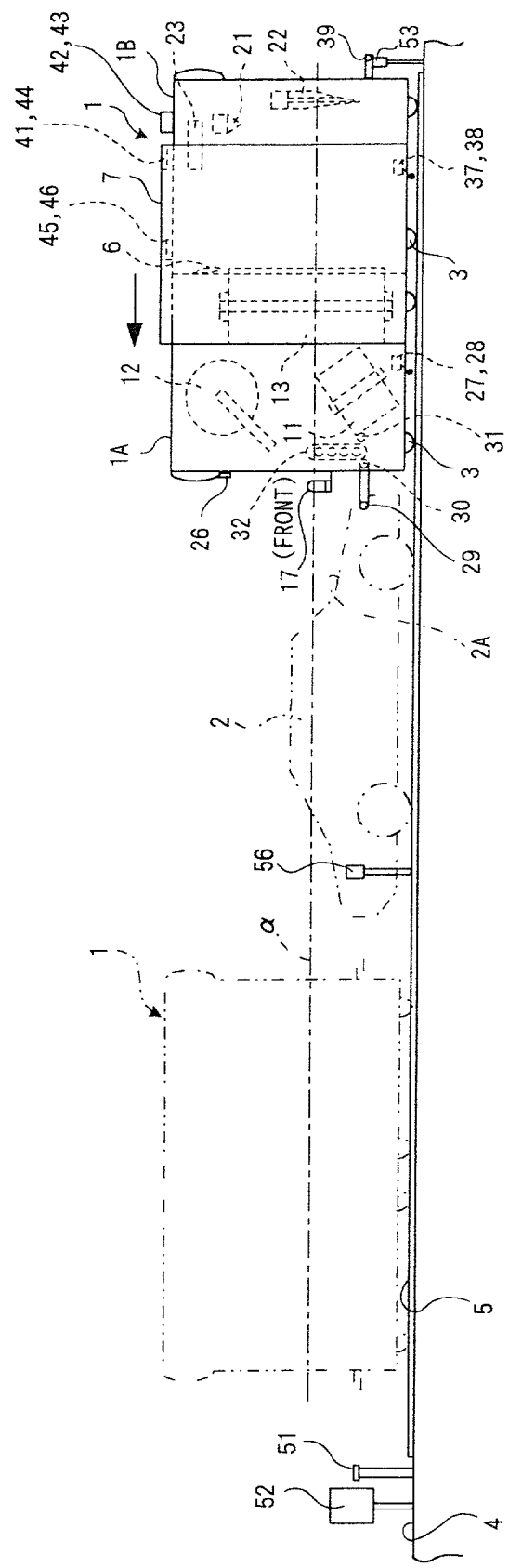
FIG. 1 is a schematic side view of a car washing machine according to an embodiment of the invention.
Figure 2:
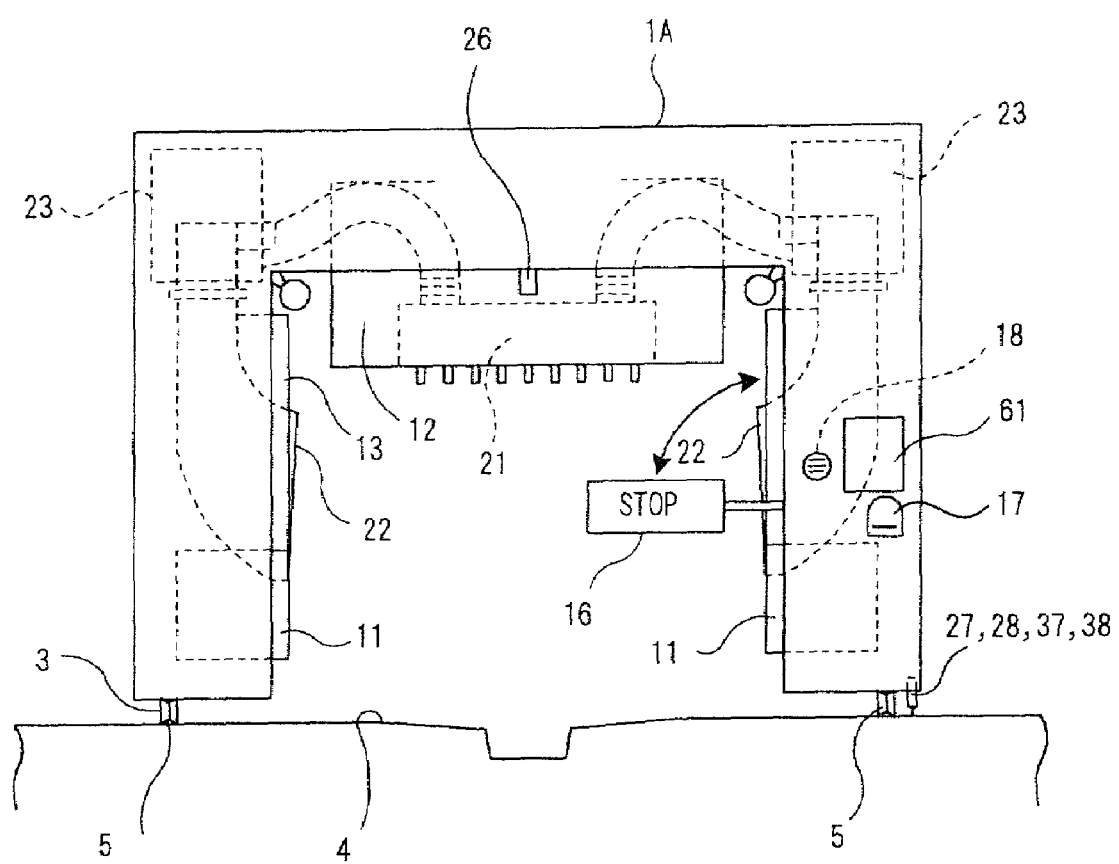
FIG. 2 is a front view of the car washing machine.
Figure 3:
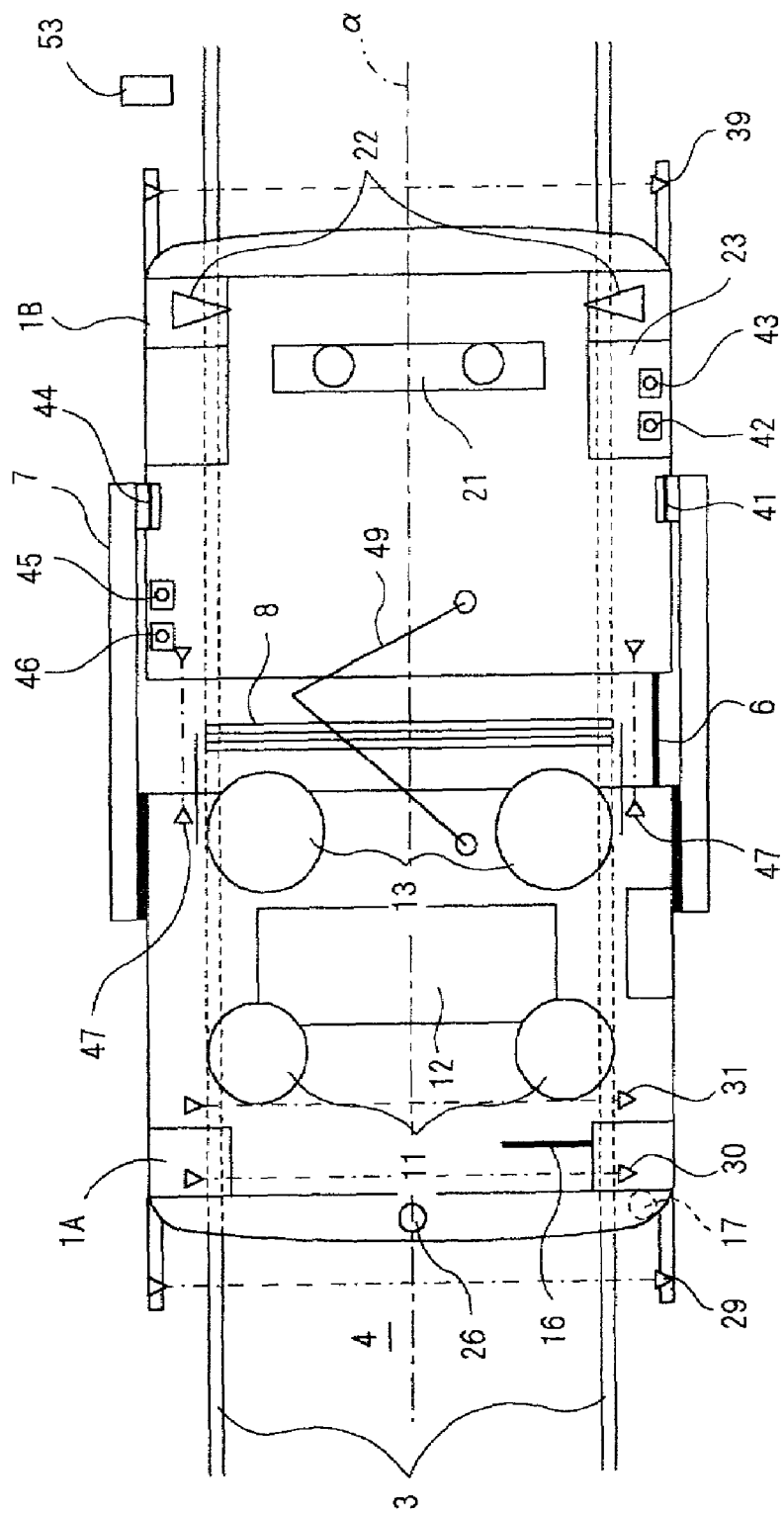
FIG. 3 is an arrangement diagram of machines and tools in a main body of the car washing machine.

In FIGS. 1–3, the numeral 1 denotes a gate-shaped car washing machine straddling a vehicle 2 to be washed and adapted to travel along a fixed path α in the longitudinal direction of the vehicle 2. This car washing machine 1 is arranged such that while moving forward along the fixed path α, it washes the vehicle 2 and, on completion of washing, it causes the vehicle 2 to leave it from the rear of the car washing machine 1. In addition, in this embodiment, the layout is such that on completion of car washing, the vehicle 2 leaves in the transverse direction orthogonal to the direction of travel of the car washing machine 1.

The car washing machine 1 is constructed by being separated into a front body 1A provided with a washing means for washing the vehicle 2, and a rear body 1B provided with a drying means for drying the vehicle 2, so that they are capable of separately traveling on a pair of traveling rails 5 laid on a floor surface 4 through respective pluralities of wheels (traveling wheels) 3. Further, the front and rear bodies 1A and 1B are connected by a wire (an example of a cable) 6 such that they are free to move toward and away from each other. A cover (an example of a covering means) 7 is provided such that these front and rear bodies 1A and 1B look as if they were a single unit when they are spaced apart from each other and such spaced-apart gap portion is covered. This cover 7 is fixed at the front end thereof to the front body 1A and at the rear body 1B it is slidable according to their movement toward and away from each other. In the inner upper portion of the cover 7 on the front body 1A side, an arch 8 (FIG. 3) is provided to prevent water from splashing in a transverse direction orthogonal to the direction of travel of the car washing machine 1 during car washing to be later described.

Installed in the front body 1A as washing means for the vehicle 2, in order from front to rear, are a pair of right and left rocker brushes 11 capable of forward and backward movements in a transverse direction orthogonal to the direction of travel of the car washing machine 1 for washing the tires and lower side surfaces of the vehicle 2, a top brush 12 vertically movable for washing the upper surface of the vehicle 2, and a pair of side brushes 13 transversely movable for washing the front and rear surfaces and both side surfaces of the vehicle 2. Further, a spray device (not shown) is provided for spraying washing water or a detergent liquid or a liquid wax on the vehicle 2. Further, the side brushes 13 are provided with a side brush full-close state detection limit switch 14 (FIG. 5) for detecting the full-close state of the side brushes 13, and a side brush full-open state detection limit switch 15 (FIG. 5) for detecting the full-open state of the side brushes 13.

Further, as means for guiding the vehicle 2 to a vehicle stop position (FIG. 4: car washing position), a stop guide plate 16 for guiding the driver of the vehicle 2 to a stop position is installed on the front end of the front body 1A and behind the vehicle stop position, and a red guide indicator lamp 17 and a speaker (an example of an announcing means) 18 is installed on the front surface of the front body 1A. The stop guide plate 16 will be housed in the front side region when car washing is started.

Installed in the rear body 1B as means for drying the vehicle 2 are a top nozzle 21 vertically movable for drying the upper surface of the vehicle 2, a pair of side nozzles 22 transversely movable for drying both side surfaces of the vehicle 2, and a pair of right and left blower devices 23 which simultaneously communicate with both nozzles 21 and 22 for feeding air thereto.

The following various sensors are installed in the front body 1A.

That is, installed in the front surface upper portion of the front body 1A is a car height sensor (vehicle detecting means) 26 consisting of an ultrasonic sensor for detecting the vehicle 2, and installed in the lower end of the front body 1A are a front Hp limit switch 27 for detecting that the front body 1A is in a travel start position (home position; abbreviated as HP), and a front OP limit switch 28 for detecting that the front body 1A is in a travel termination position (opposite position; abbreviated as OP).

Figure 4:
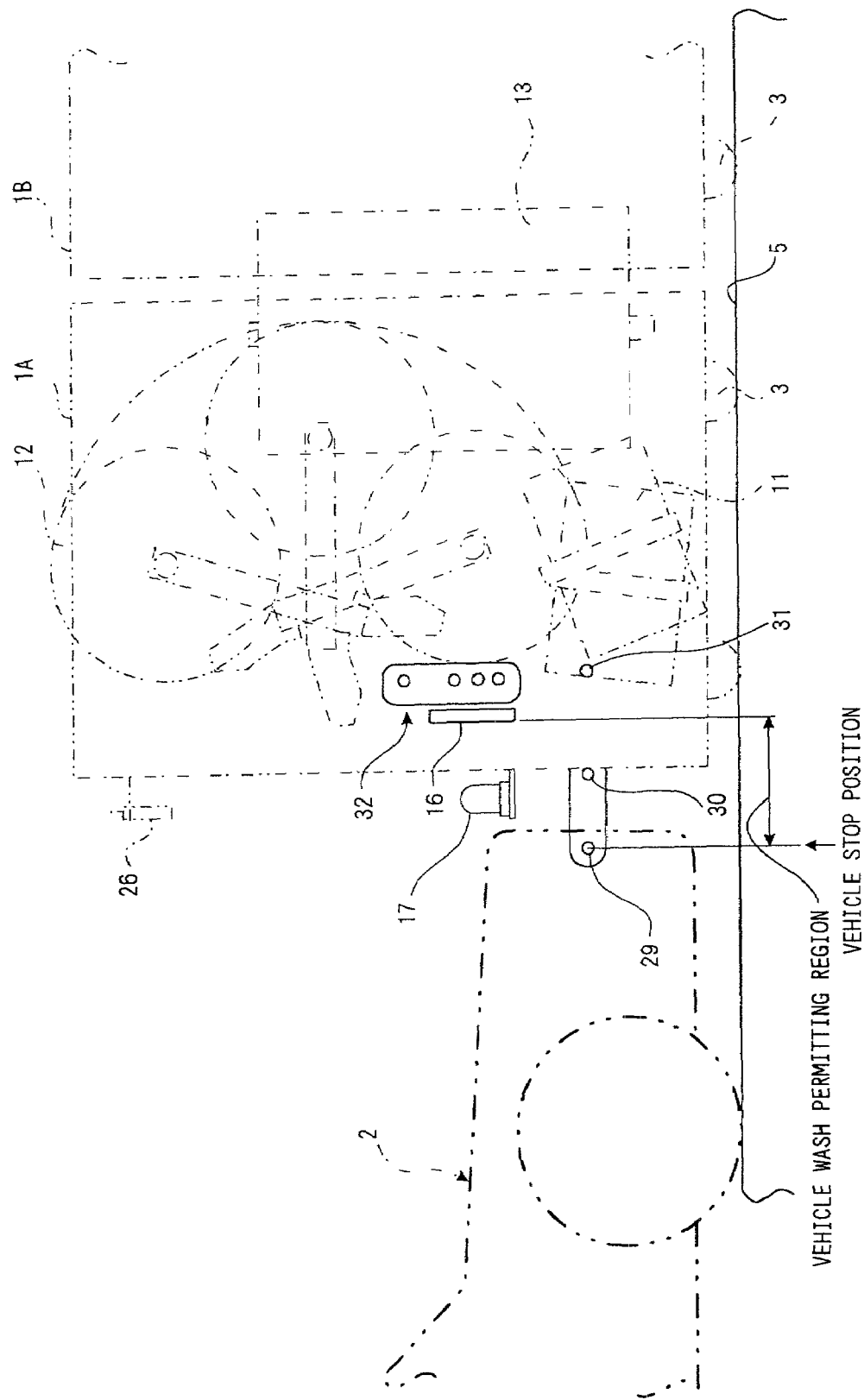
FIG. 4 is an arrangement diagram of a bonnet height detecting sensor of the car washing machine.

Further, as shown in FIG. 4 in detail, a car shed entry detector 29 consisting of a photoelectric switch for detecting the car shed entry of the vehicle 2 is installed in the vehicle stop position as it is projected forward from the front surface of the front body 1A, and a vehicle length sensor 30 consisting of a photoelectric switch for detecting the entry of the vehicle 2 into the front end of the front body 1A is installed in and adjacent the front surface of the front body 1A. Further, installed in the front end of the front body 1A and behind the vehicle stop position are a vehicle front end detecting sensor 31 consisting of a photoelectric switch for detecting that the vehicle 2 enters the region inside the stop guide plate 16 and as a means for detecting the height of the bonnet 2A of the vehicle 2, there is provided a bonnet height detecting sensor 32 consisting of a plurality (4 units in the figure) of photoelectric switches disposed parallel one above another with their optical axes extending horizontal. The bonnet height detecting sensor 32 detects the height of the bonnet 2A of the vehicle 2 in that the optical axes of the photoelectric switches are cut off by the bonnet 2A of the vehicle 2.

Further, the side brushes 13 are provided with a front car body detecting limit switch 33 (FIG. 5) which, when the side brushes 13 contact the vehicle 2 to be tilted to the OP side, is activated to detect the front end of the vehicle 2, and a rear car body detecting limit switch 34 (FIG. 5) which, when the side brushes 13 contact the vehicle 2 to be tilted to the HP side, is activated to detect the rear end of the vehicle 2. Further, the stop guide plate 16 is provided with a guide plate bend sensor (an example of a contact detecting means for detecting contact with a vehicle to be washed) 35 (FIG. 5) which, when the stop guide plate 16 contacts the vehicle 2 to be tilted, is activated to detect the vehicle 2. Further, one of the wheels 3 has a front pulse encoder 36 (an example of a front travel detecting means) (FIG. 5) connected to the rotary shaft thereof.

Further, the rear body 1B is provided with the following various sensors.

That is, as shown in FIG. 1, the lower end of the rear body 1B is provided with a rear Hp limit switch 37 for detecting that the rear body 1B is in a travel start position (home position; abbreviated as HP), and a rear OP limit switch 38 for detecting that the rear body 1B is in a travel termination position (opposite position; abbreviated as OP). Further, projecting rearward from the back (rear end) of the rear body 1B is a car shed leave detector 39 consisting of a photoelectric switch for detecting the leaving of the vehicle 2 from the car shed. Further, one of the wheels 3 has a rear pulse encoder 40 (an example of a rear travel detecting means) (FIG. 5) connected to the rotary shaft thereof.

Further, the ceiling of the rear body 1B, as shown in FIG. 3, is provided, as a detecting means for detecting the positional relationship between the front and rear bodies 1A and 1B, with a closing-direction deceleration confirmation limit switch 42 for deceleration purposes and a closed limit confirmation limit switch 43 for stop purposes, which are adapted to be activated by a to-be-detected body 41 projecting inward from one end of the cover 7, and a tracking confirmation limit switch (an example of a spacing detecting means adapted to be activated when the spacing between the front and rear bodies 1A and 1B is constant) 45 for tracking purposes and a terminal end limit (opened limit) confirmation limit switch 46 for stop purposes, which are adapted to be activated by a to-be-detected body 44 projecting inward from other end of the cover 7. The closing-direction deceleration confirmation limit switch 42 for deceleration purposes is set such that it will be activated when it is necessary to decelerate the front body 1A or the rear body 1B in the case where the front and rear bodies 1A and 1B are moving while being closer to each other. The closed limit confirmation limit switch 43 for stop purposes is disposed at a position (closed limit position) where the front and rear bodies 1A and 1B can be mechanically closest to each other. Further, the tracking confirmation limit switch 45 for tracking purposes is set such that it will be activated when the distance between the front and rear bodies 1A and 1B becomes equal to a tracking distance (set spacing distance; a largest possible spacing distance which allows the front and rear bodies 1A and 1B to move while tracking) L. The terminal end limit (opened limit) confirmation limit switch 46 for stop purposes is disposed at a position (opened limit position) where the front and rear bodies 1A and 1B can be mechanically spaced most apart from each other.

Further, as shown in FIG. 3, a plurality of sets (two sets in FIG. 3) of getting-between confirmation sensors 47 consisting of photoelectric switches are installed to detect the presence (or the getting-between) of a thing or a person between the front and rear bodies 1A and 1B. Further, an arm 49 is installed between the front and rear bodies 1A and 1B to support electric wires used for the feeding of electricity and the receiving and sending of data.

Further, as shown in FIG. 1, disposed in front of the front end of the traveling rails 5 are a crossing gate 51 for controlling the advance of the vehicle 2 to the car washing position, and a remote panel 52 having arranged thereon operating switches for inputting start, stop instruction, car washing mode, etc. Further, disposed behind the rear end of the traveling rails 5 is a exit signal lamp 53 to prompt the driver of the vehicle 2 to leave (escape from the car washing position) due to completion of car washing. Further, the remote panel 52 is provided with a speaker 54 (FIG. 5).

As described above, the layout is such that the vehicle 2 leaves the car washing position in the transverse direction orthogonal to the direction of travel of the car washing machine 1. As a leave detection means for detecting the leave of the vehicle 2, there is provided a leave detection sensor 56 for detecting the leave of the vehicle 2 in the direction orthogonal to the direction of travel of the car washing machine 1. The leave detection sensor 56 is composed of three transmission type (or coaxial reflection type) photoelectric switches disposed such that the optical axis crosses the leaving path of the vehicle 2 at three places, for example, within the rails 5, above the rails 5 and outside the rails 5.

Figure 5:
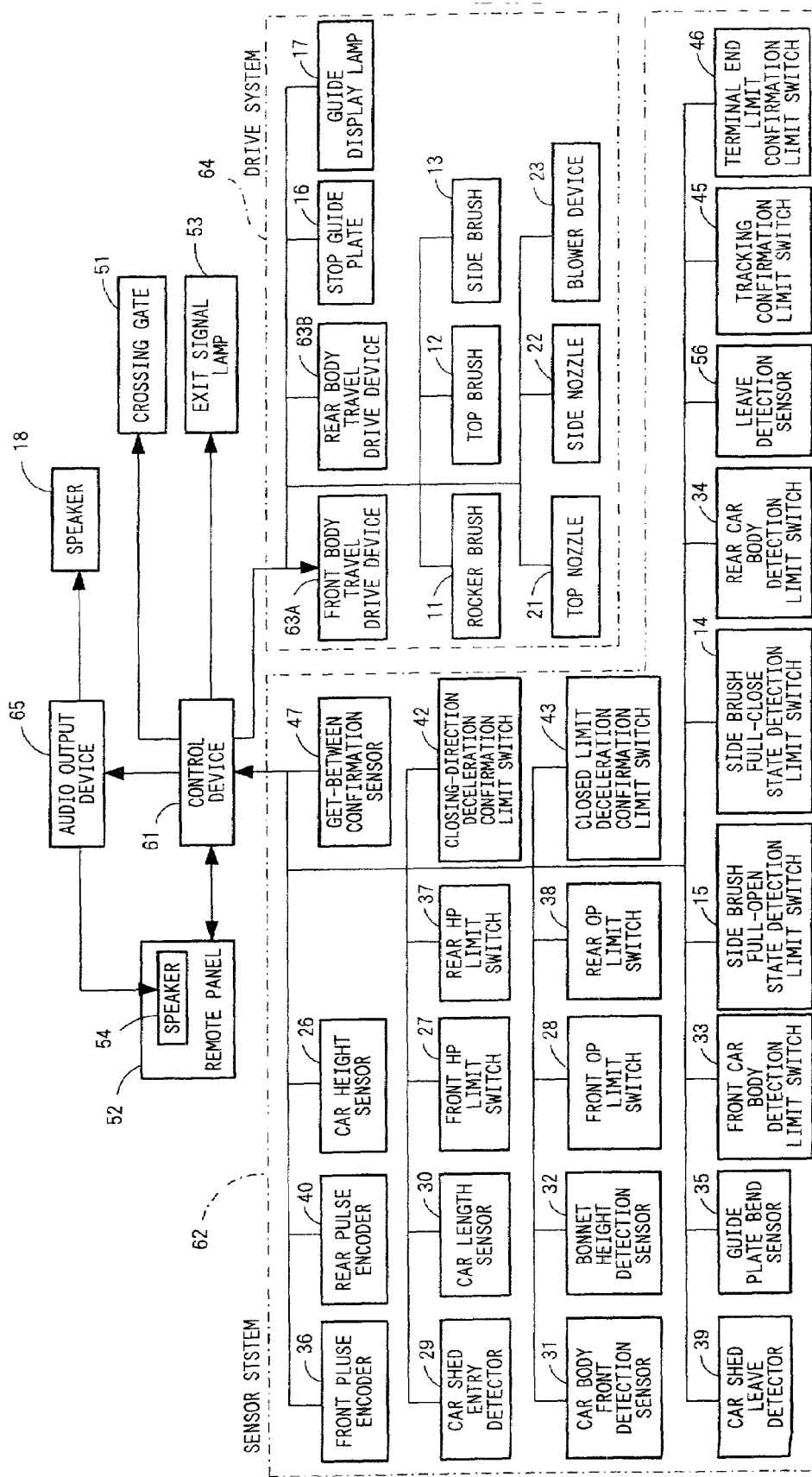
FIG. 5 is a block diagram of a control system of the car washing machine.

A control block diagram of the car washing machine of the above construction is shown in FIG. 5.

As shown, the control block of the car washing machine comprises a control device 61 consisting of a microcomputer contained in the front body 1A, etc., a sensor system 62 consisting of a remote panel 52, a car height sensor 26, limit switches 27 and 28, pulse encoders 36 and 40, etc. which are connected to the control device 61, a drive system 64 consisting of a travel drive device (including a travel motor) 63A connected to the wheels 3 of the front body 1A for causing the front body 1A to travel by driving the wheels 3, a travel drive device (including a travel motor) 63B connected to the wheels 3 of the rear body 1B for causing the rear body 1B to travel by driving the wheels 3, brushes 11, 12, and 13, drying nozzles 21 and 22, a stop guide plate 16, etc, the crossing gate 51, the exit signal lamp 53 and an audio output device (an example of an announcing means) 65.

The audio output device 65 selects pre-inputted audio data according to the code number instructed from the control device 61, outputs to the specified speaker 18 or 54, makes a verbal announcement (an example of announcement). Example of the code numbers and the contents of the announcement are as follows.

Code number 1; Please advance your car slowly to the stop guide plate.

Code number 2; Please advance slowly until the red guide indicator lamp is turned on.

Code number 3; Please stop your car. (1 second after); Please put the gear in parking position and apply your handbrake hard. Stop the engine when you have closed the window. Car washing will soon be started.

Code number 4; You have advanced your car too far. Please set the front end of your car to the stop guide plate.

Code number 5; Car washing has been completed.

Code number 6; Please drive your car to leave the car shed slowly.

Code number 7; Watch out, the car washing machine is moving back.

Figure 6:
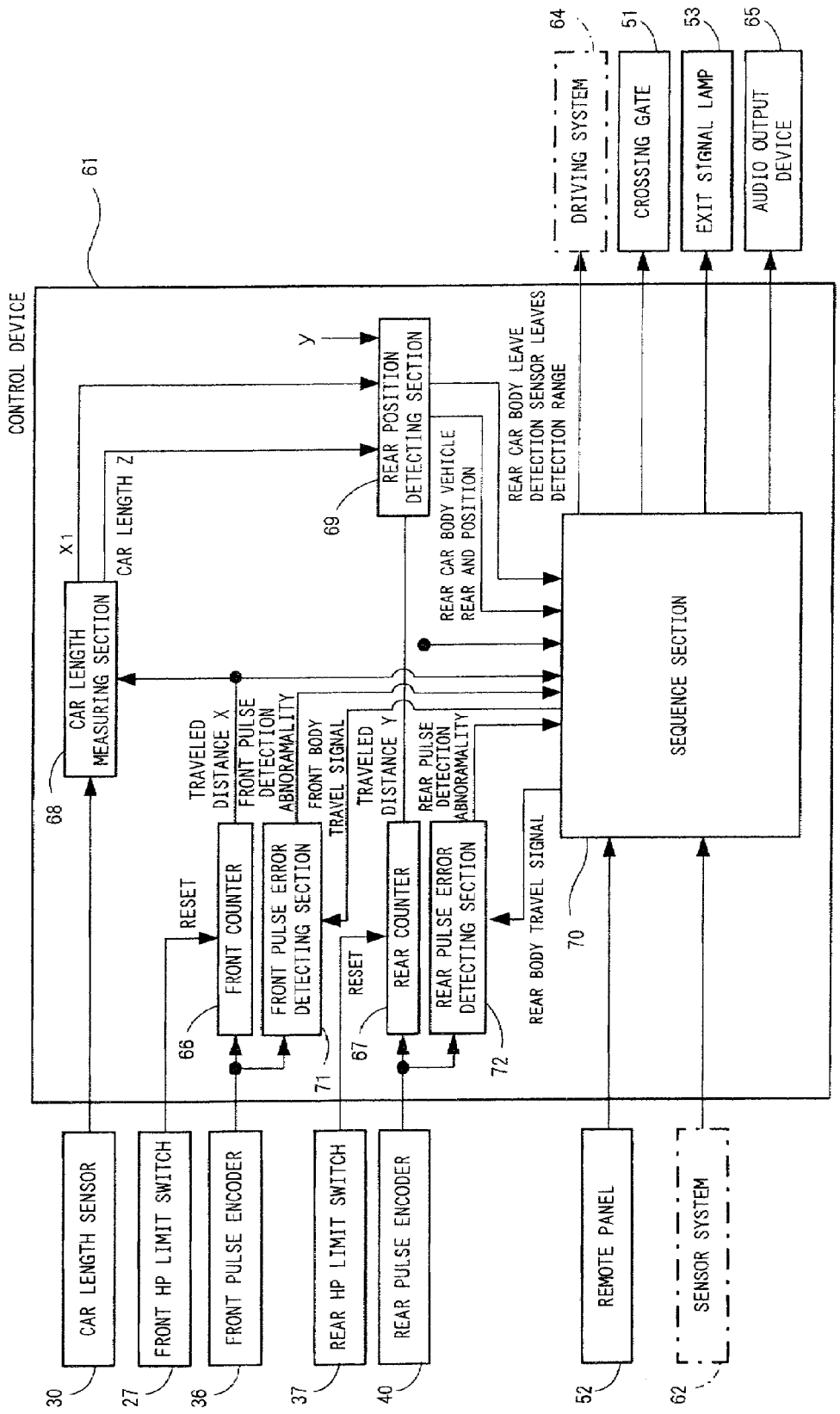
FIG. 6 is a block diagram of a control device of the car washing machine.
Figure 7:
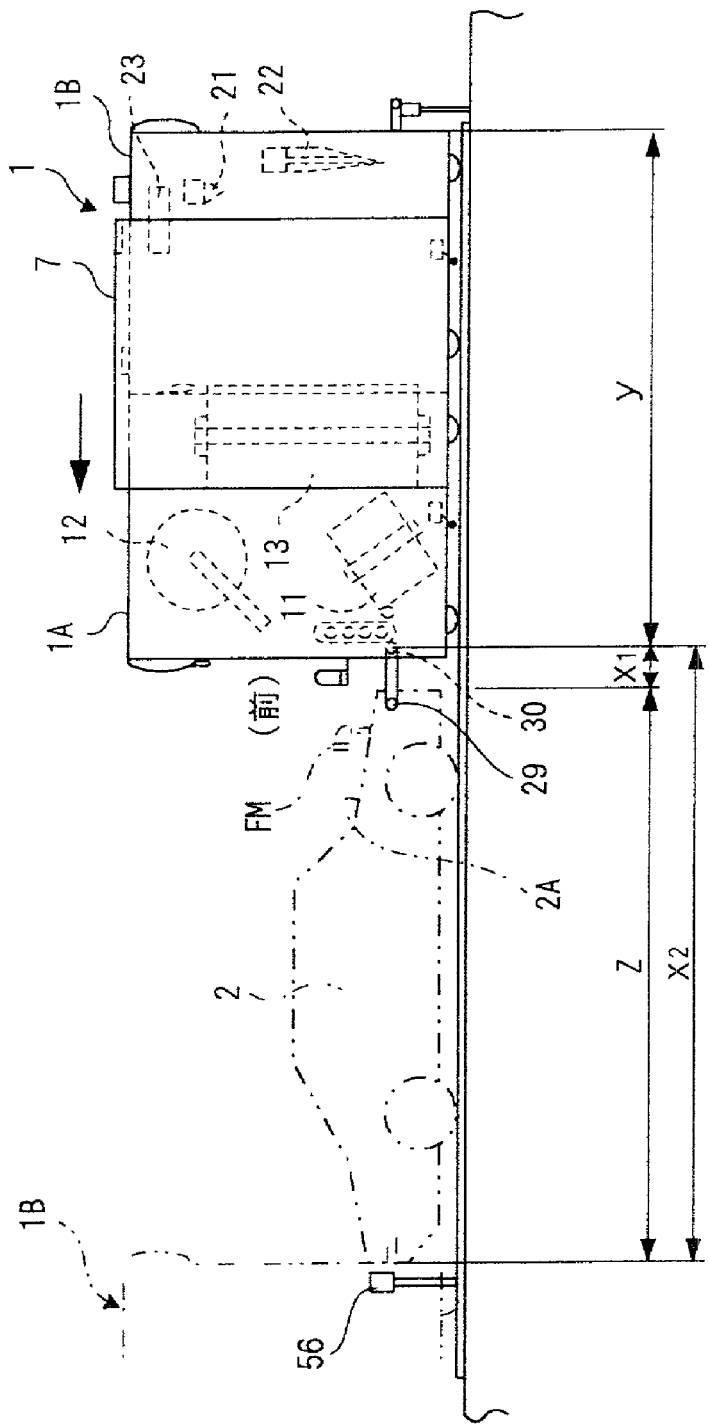
FIG. 7 is a view for explaining a distance between the main body of the car washing machine and a vehicle to be washed.

The control device 61, as shown in FIG. 6, comprises a front counter (an example of a front travel detection means) 66 adapted to be reset by the front HP limit switch 27 and count the output pulses from the front pulse encoder 36 so as to detect the traveled distance X from the HP of the front body 1A, a rear counter (an example of a front travel detection means) 67 adapted to be reset by the rear HP limit switch 37 and count the output pulses from the rear pulse encoder 40 so as to detect the traveled distance Y from the HP of the rear body 1B, a car length measuring section 68 adapted to store the count value (traveled distance) x1 (see FIG. 7) of the front counter 66 when a car length sensor 30 is activated (turned on) and store the count value (traveled distance) x2 (see FIG. 7) of the front counter 66 when the car length sensor 30 is deactivated (turned off) and to measure the car length Z (=x2−x1) (see FIG. 7) of the vehicle 2 through subtraction using these count values (traveled distance), a rear position detecting section 69 having preset therein a distance (count value) y (see FIG. 7) between the car length sensor 30 and the rear end of the rear body 1B when the closed limit confirmation limit switch 43 is activated, and adapted to have inputted thereinto the count value (traveled distance) x1 and the car length Z found by the car length measuring section 68 when the car length sensor 30 is activated (turned on),and to detect that the traveled distance Y from the HP of the rear body 1B found by the rear counter 67 becomes equal to the added value of distances (x1+y+Z), i.e., that the rear end of the rear body 1B reaches the rear end of the vehicle 2, a sequence section 70 adapted to have inputted thereinto and stored therein operating signals such as for start and stop from the remote panel 52, and detection signals from the sensor system 62, to have inputted thereinto the traveled distance X from the HP of the front body 1A detected by the front counter 66 and the traveled distance Y from the HP of the rear body 1B detected by the rear counter 67, to have inputted thereinto the detection signal from the rear position detecting section 69 detecting that the rear end of the rear body 1B has reached the rear end of the vehicle 2, and adapted, while recognizing the distance X traveled by the front body 1A or the distance Y traveled by the rear body 1B and the shape of the vehicle 2 from the car height data found by the car height sensor 26, to control, according to these operating signals, detection signals and data, the driving system 64, crossing gate 51, exit signal lamp 53 and audio output device 65, thereby controlling the entire operation of the car washing machine 1 to execute the car washing operation, a front pulse error detecting section 71 which confirms that the front body 1A is traveling, by a front body travel signal (to be later described) inputted from the sequence section 70, whereupon it confirms whether it is receiving output pulses from the front pulse encoder 36, wherein if it confirms that it is not receiving them, it outputs a front pulse error signal to the sequence section 70, and a rear pulse error detecting section 72 which confirms that the rear body 1B is traveling, by a rear body travel signal (to be later described) inputted from the sequence section 70, whereupon it confirms whether it is receiving output pulses from the rear pulse encoder 40, wherein if it confirms that it is not receiving them, it outputs a rear pulse error signal to the sequence section 70.

The operations of the front and rear bodies 1A and 1B, brushes 11, 12 and 13, drying nozzles 21 and 22, and blower device 23 under the control of the sequence section 70 of the control device 61 will be described in detail.

<First Operation>

Figure 8:
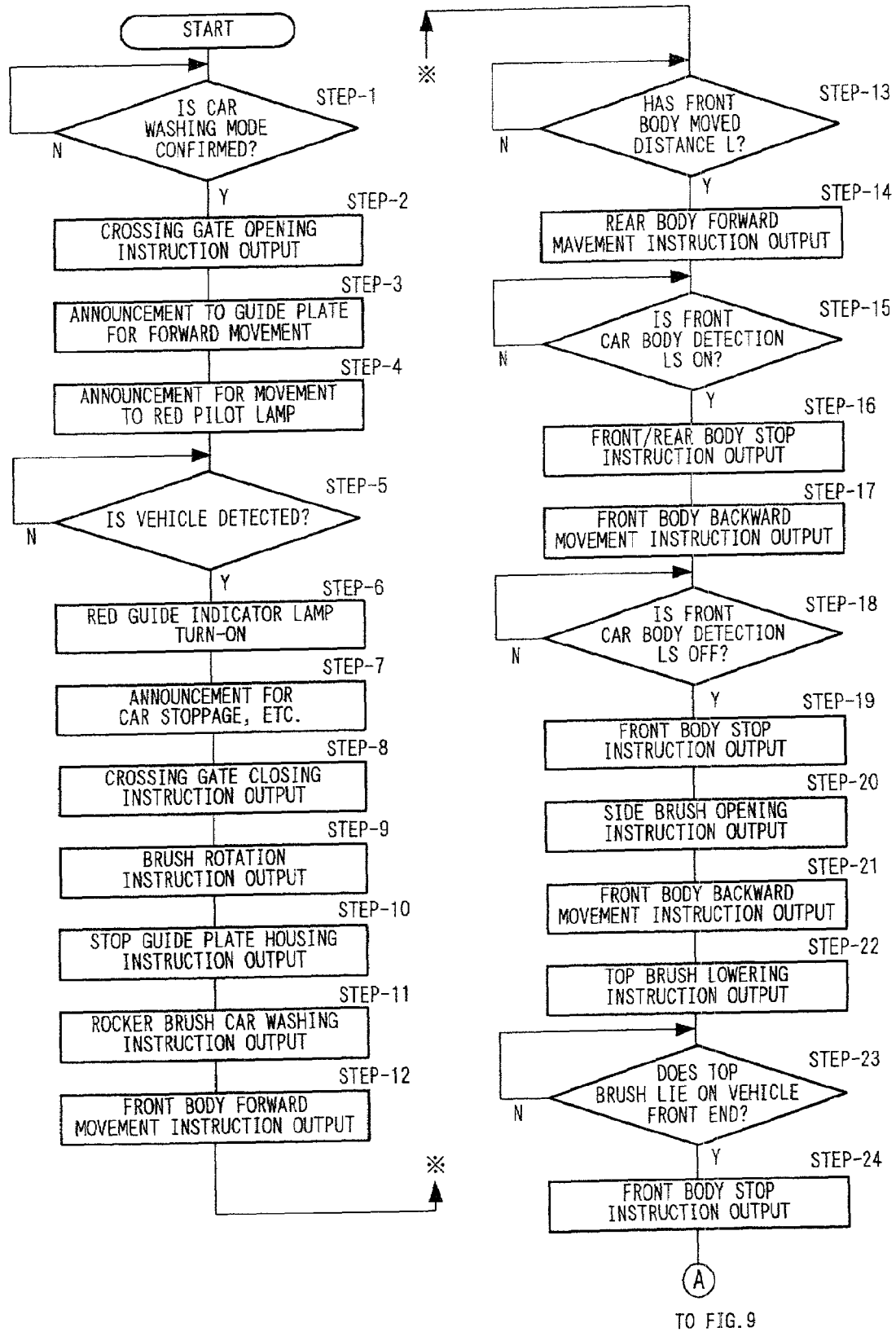
FIGS. 8–10 are flowcharts showing procedures, in order of occurrence, involved in an ordinary "first operation" control method for the car washing machine.
Figure 9:
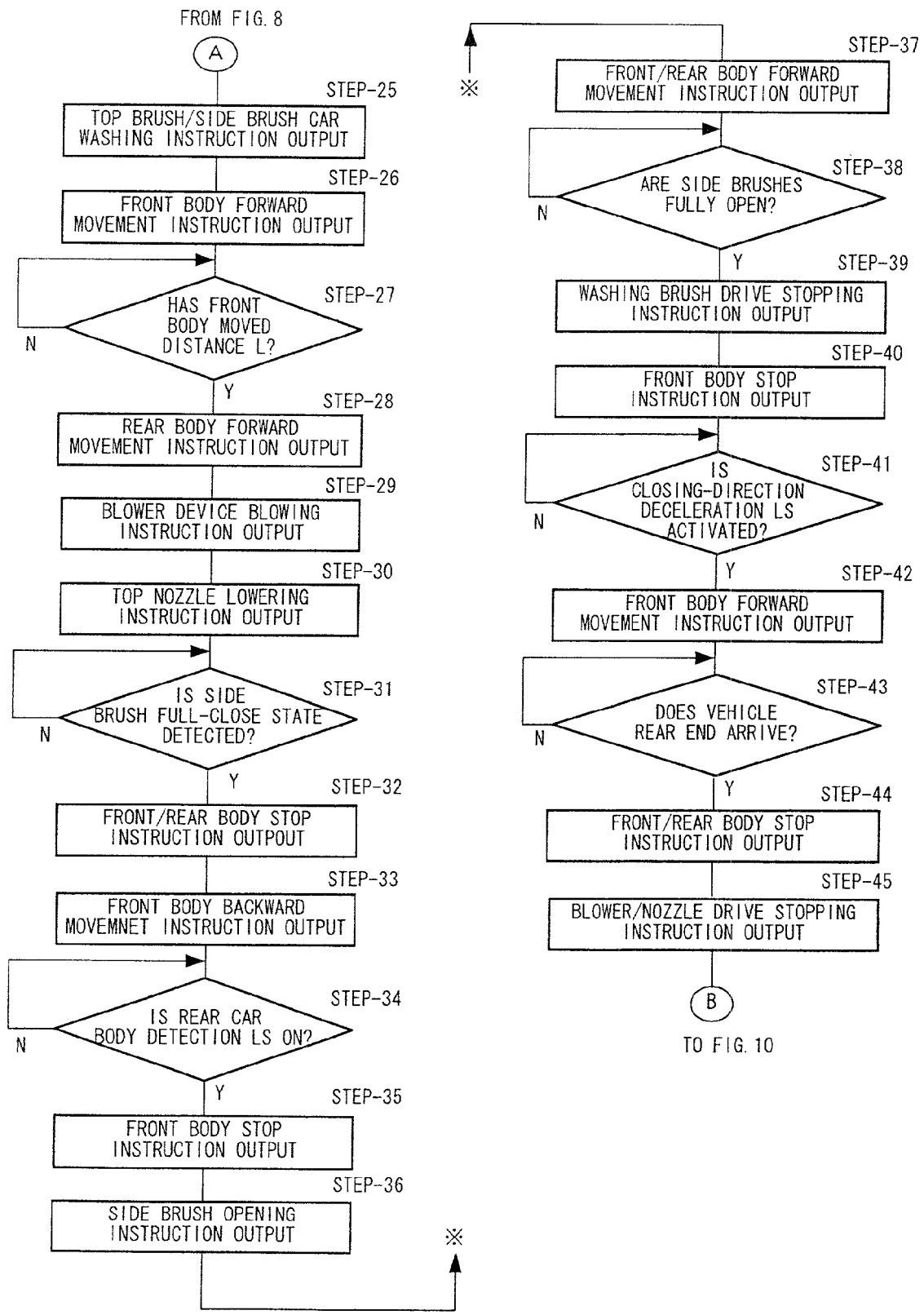
Figure 10:
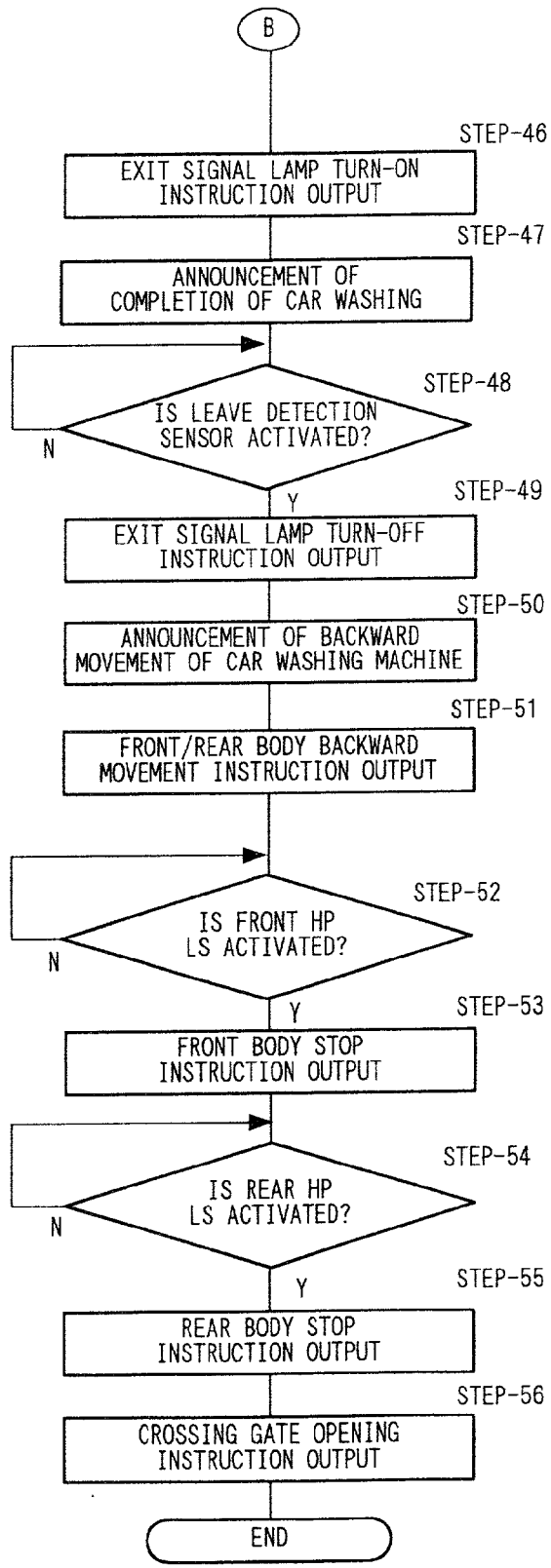

A first operation with the traveled distances X and Y normally detected by the front and rear counters 66 and 67 will first be described in detail with reference to the flowcharts of FIGS. 8–10 and operation explanatory views shown in FIGS. 11–13. That is, an explanation will be given in the situation where no front pulse error signal is inputted from the front pulse error detecting section 71 into the sequence section 70 and no rear pulse error signal is inputted from the rear pulse error detecting section 72 into the sequence section 70. In addition, as shown in FIG. 11*a*, it is assumed that the front and rear bodies 1A and 1B are stopped in the HP, which is the waiting position, and that there is no vehicle 2 which is being washed, the vehicle 2 being stopped in front of the crossing gate 51. It is also assumed that the pair of side brushes 21 are closed and that the top brush 12 and the top nozzle 21 are lifted or lowered according to the shape of the vehicle 2.

<Vehicle Guide Operation>

When the car washing mode necessary for car washing is set by the remote panel 52 (step-1), an opening instruction is outputted to the crossing gate 51 to open (step-2). Subsequently, the car washing machine body 1 is specified to the audio output device 65 to output the code number 1 and the speaker 18 of the car washing machine 1 repeats three times the announcement "please advance your car slowly to the stop guide plate" (step-3). Subsequently, the car washing machine 1 is specified and the code number 2 is outputted to the audio output device 65, and the speaker 18 of the car washing machine 1 makes the announcement "please advance slowly until the red guide indicator lamp is lighted" (step-4).

Thereby, as shown in FIG. 11*b,* the crossing gate 51 is opened and the vehicle 2 is advanced to the stop guide plate 16.

<Car Washing Operation>

In accordance with the above-mentioned announcement, the vehicle 2 is advanced and the car shed entry detector 29 is activated (step-5), whereupon the red guide indicator lamp 17 is lighted (step-6). Then, the code number 3 is outputted to the audio output device 65 while specifying the car washing machine 1, thus causing the speaker 18 of the car washing machine 1 to make the announcement "please stop your car. (One second after) please put the gear in parking position and apply your handbrake hard. Stop the engine when you have closed the window. Car washing will soon be started" (step-7). And a closing instruction is outputted to the crossing gate 51 (step-8). Thereby, the vehicle 2 is stopped in the car washing position in front of the stop guide plate 16, and the crossing gate 51 is closed to prevent the entry of the next vehicle 2. In addition, as the vehicle 2 advances, it contacts the stop guide plate 16 to activate the guide plate bend sensor 35 or the car body front end detecting sensor 31, whereupon the car washing machine 1 is specified and the code number 4 is outputted to the audio output device 65, and the speaker 18 of the car washing machine 1 makes the announcement "you have advanced your car too far. Please set the front end of your car to the stop guide plate," and the red guide indicator lamp 17 is turned off. And the vehicle 2 is moved back in accordance with the announcement until both the guide plate bend sensor 35 and the car body front end detection sensor 31 become deactivated, with only the car shed entry detector 29 activated, whereupon the step-6 and step-7 are executed.

Then, a brush rotation instruction signals are outputted to the brushes 11, 12 and 13 (step-9), and a housing instruction signal is outputted to the stop guide plate 16 (step-10). Subsequently, a car washing instruction signal is outputted to the rocker brush 11 (step-11) and a forward movement instruction is outputted to the travel drive device 63A of the front body 1A (step-12). In addition, when a forward or backward movement instruction is outputted to the travel drive device 63A of the front body 1A, a front body travel signal will be outputted to the front pulse error detecting section 71 (hereinafter the same).

With this arrangement, as shown in FIG. 11*c,* after the stop guide plate 16 has been housed, the advance of the front body 1A is started to perform the washing of the tires and the lower portions of the side surfaces of the vehicle 2 with the rocker brush 11.

Further, when the front body 1A travels the tracking distance L to activate the tracking confirmation limit switch 45 (step-13), a forward movement instruction is outputted to the travel drive device 63B of the rear body 1B (step-14). In addition, when an forward or backward movement instruction is outputted to the travel drive device 63B of the rear body 1B, a rear body travel signal will be outputted to the rear pulse error detecting section 72 (hereinafter the same).

Thereby, as shown in FIG. 11d, with the tracking distance L maintained between the front and rear bodies 1A and 1B, the rear body 1B also starts forward movement.

Subsequently, as shown in FIG. 11e, the side brushes 13 contact the front surface of the vehicle 2 and are tilted to activate the front car body detecting limit switch 33, and the signal therefrom is inputted into the sequence section 70 (step-15), whereupon a stop instruction is outputted to the respective travel drive devices 63A and 63B of the front and rear bodies 1A and 1B (step-16). Subsequently, a backward movement instruction is outputted to the travel drive device 63A of the front body 1A (step-17), and when the signal from the front car body detecting limit switch 33 is off (step-18), a stop instruction is outputted to the travel drive device 63A of the front body 1A (step-19) and an opening instruction is outputted to the side brushes 13 (step-20). Thereby, after the front and rear bodies 1A and 1B have advanced, they are stopped by the signal from the front car body detecting limit switch 33. Subsequently, the front body 1A moves backward, and, as shown in FIG. 11f, when it stops with the side brushes 13 contacting it, the front surface of the vehicle 2 is washed by the brushes 13.

Subsequently, a backward movement instruction is outputted to the travel drive device 63A of the front body 1A (step-21), and a lowering instruction is outputted to the top brush 12 to lower to a level having an allowance for the bonnet height detected by the bonnet height detecting sensor 32 (step-22). And when the top brush 12 is positioned at the front end of the vehicle 2 (when the front body 1A moves backward the distance between the top brush 12 and the side brushes 13 in accordance with the traveled distance detected by the front counter 66) (step-23), a stop instruction is outputted to the travel drive device 63A of the front body 1A (step-24). Thereby, as shown in FIG. 11g, the front body 1A stops with the top brush 12 positioned at the front end of the vehicle 2. At this time, the side brushes 13 are in their opened state, and the distance between the front and rear bodies 1A and 1B has been reduced by an amount corresponding to the distance traveled backward by the front body 1A.

Figure 12I:
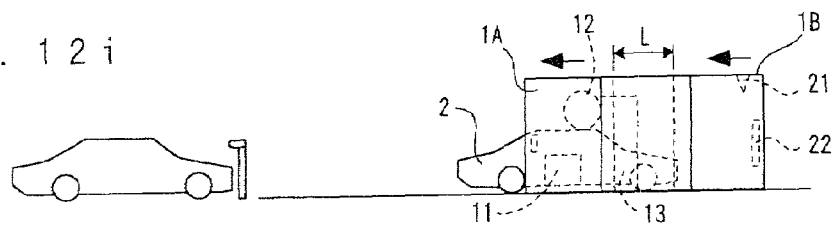

Subsequently, a car washing instruction signal is outputted to the top brush 12 and side brushes 13 (step-25) and a forward movement instruction is outputted to the travel drive device 63A of the front body 1A (step-26). Thereby, as shown in FIG. 11h, the front body 1A starts moving forward while washing the upper surface and both side surfaces of the vehicle 2 by the top brush 12 and side brushes 13. And, when the tracking confirmation limit switch 45 is activated by the forward movement of the front body 1A (step-27), a forward movement instruction is outputted to the travel drive device 63B of the rear body 1B (step-28). Thereby, as shown in FIG. 12i, with the tracking distance L maintained between the front and rear bodies 1A and 1B, the rear body 1B also starts forward movement.

Figure 12J:
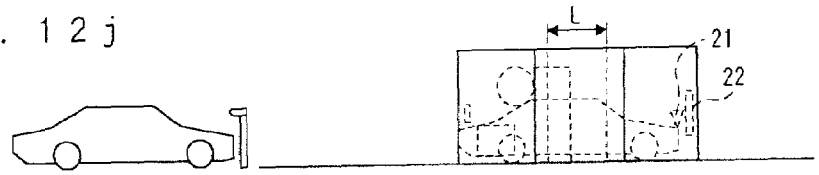
Figure 12K:
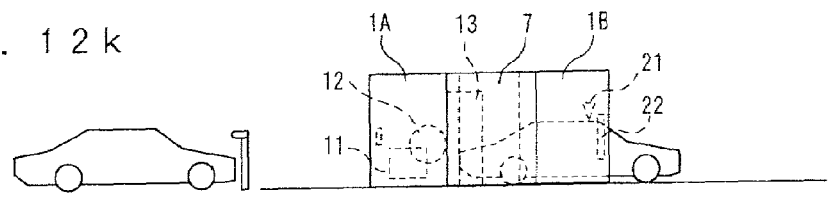

Subsequently, a blowing instruction is outputted to the blower devices 23 for the drying nozzles 21 and 22 (step-29), and a lowering instruction is outputted to the top nozzle 21 to lower to a level having an allowance for the bonnet height detected by the bonnet height detecting sensor 32 (step-30). Thereby, as shown in FIGS. 12j and 12k, the top nozzle 21 lowers to the front end of the vehicle 2 and the upper surface and both side surfaces of the vehicle 2 are dried by the drying nozzles 21 and 22. At this time, the washing of the vehicle 2 by the brushes 11, 12 and 13 has been executed. The distance between brushes 11, 12, 13 and the drying nozzles 21, 22 is set at the tracking distance L or more.

Figure 12L:
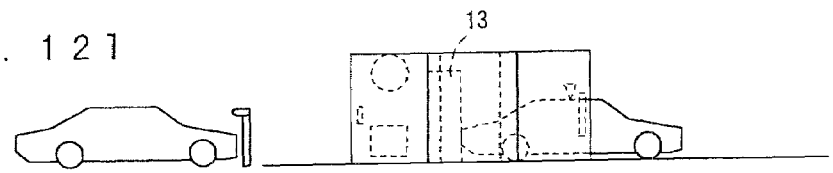

Subsequently, the washing of the side surfaces of the vehicle 2 by the side brushes 13 is completed, and when the side brushes 13 come around to the back of the vehicle 2 to activate the side brush full-close state detection limit switch 14 (step-31), a stop instruction is outputted to each of the travel drive devices 63A and 63B of the front and rear bodies 1A and 1B (step-32). Thereby, as shown in FIG. 12l, the front and rear bodies 1A and 1B stop with the side brushes 13 positioned on the back of the vehicle 2.

Figure 12M:
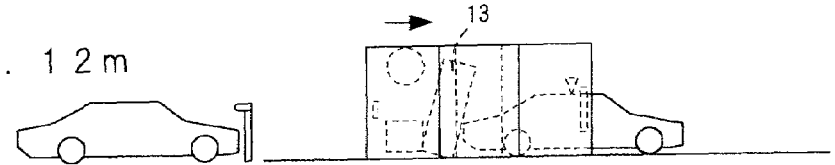
Figure 12N:
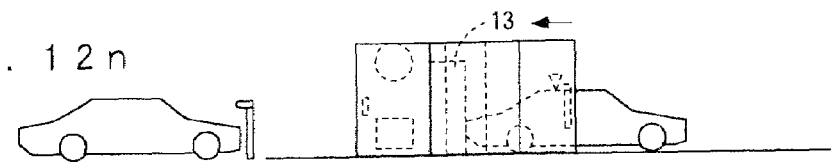

Then, a backward movement instruction is outputted to the travel drive device 63A of the front body 1A (step-33), and when the rear car body detection limit switch 34 is activated (step-34), a stop instruction is outputted to the travel drive device 63A of the front body 1A (step-35) and an opening instruction is outputted to the side brushes 13 (step-36). And, a forward movement instruction is outputted to each of the travel drive devices 63A and 63B of the front and rear bodies 1A and 1B (step-37). When the side brush full-open state detection limit switch 15 is activated (step-38), a drive stopping instruction is outputted to each of the brush 11, 12 and 13 (step-39) and a stop instruction is outputted to the travel drive device 63A of the front body 1A (step-40). Thereby, as shown in FIG. 12m, the front body 1A is moved backward and it is stopped when the side brushes 13 contact the rear end of the vehicle 2 and are thereby tilted. Then, while moving forward, the vehicle 2 is washed at its back by the side brushes 13. When the side brushes 13 completely open, the driving of the brushes 11, 12 and 13 is stopped and the front body 1A is stopped. Further, as shown in FIG. 12n, the rear body 1B continues moving forward while the drying of the vehicle 2 by the drying nozzles 21 and 22 being executed.

Figure 12O:
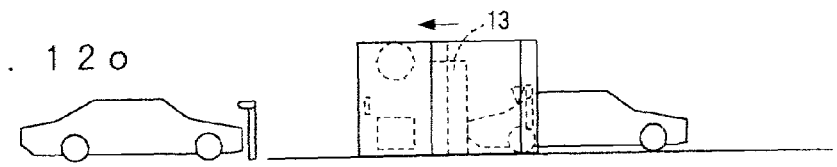

Subsequently, when the activation of the closing-direction deceleration confirmation limit switch 42 for deceleration purposes is confirmed (step-41), a forward movement instruction is outputted to the travel drive device 63A of the front body 1A (step-42). Thereby, as shown in FIG. 12o, when both of the rear body 1B approaches the front body 1A, the front and rear bodies 1A and 1B both continue forward movement.

Figure 12P:

And, when the arrival of the rear end of the rear body 1B at the rear end of the vehicle 2 is detected by the rear position detecting section 69 (step-43), a stop instruction is outputted to each of the travel drive devices 63A and 63B of the front and rear bodies 1A and 1B (step-44), and a drive stopping instruction is outputted to the drying nozzles 21 and 22 and blower devices 23 (step-45). Thereby, as shown in FIG. 12p, when the rear end of the rear body 1B reaches the rear end of the vehicle 2, the rear body 1B stops, and the driving of the drying nozzles 21 and 22 and blower devices 23 is stopped.

In addition, before the arrival of the rear body 1B at the rear end of the vehicle 2 is detected by the rear position detecting section 69, if the front OP limit switch 27 is activated, then a stop instruction is outputted to the travel drive device 63A of the front body 1A and the front body 1A is stopped, while if the rear OP limit switch 38 is activated, then a stop instruction is outputted to the travel drive device 63B of the rear body 1B and the rear body 1B is stopped. Further, when the activation of the closing-direction deceleration confirmation limit witch 42 is confirmed, a deceleration instruction is outputted to the travel drive device 63B of the rear body 1B, and when the activation of the closed limit confirmation limit switch 43 for stop purposes Ls confirmed, a stop instruction is outputted to the travel drive device 63B of the rear body 1B.

Figure 13Q:
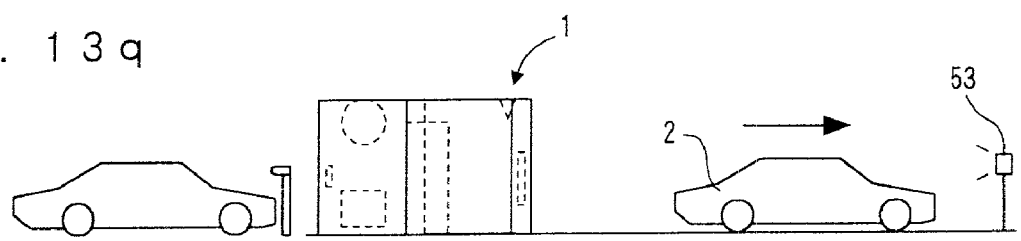

Subsequently, a lighting instruction is outputted to the exit signal lamp 53 to light the exit signal lamp 53 (step-46) and then the car washing machine 1 is specified and the code numbers 5 and 6 are outputted to the audio output device 65, causing the speaker 18 of the car washing machine 1 to make the announcement "car washing has been completed, please leave the car shed slowly" (step-47). Thereby, the exit signal lamp 53 is lighted, an announcement of leave is made, and the driver of the vehicle 2 makes his vehicle 2 leave the car shed, as shown in FIG. 13q.

Figure 13R:
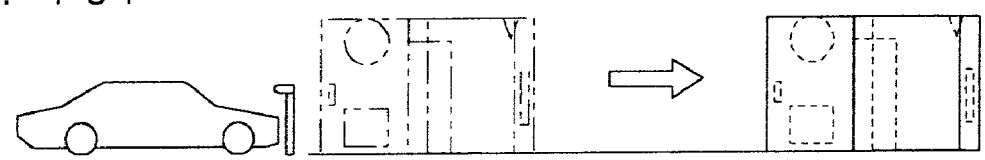

Subsequently, when the leave of the vehicle 2 is confirmed by the activation of the car shed leave detector 39 and leave detection sensor 56 (step-48), a lights-out instruction is outputted to the exit signal lamp 53 (step-49). Subsequently, the car washing machine 1 is specified and the code number 7 is outputted to the audio output device 65 to make the speaker 18 of the car washing machine body 1 make the announcement "watch out. The car washing machine is moving back" (step-50). And, a backward movement instruction is outputted to each of the travel drive devices 63A and 63B of the front and rear bodies 1A and 1B (step-51), and when the arrival of the front body 1A at the HP is confirmed by the activation of the front HP limit switch 27(step-52), a stop instruction is outputted to the travel drive device 63A of the front body 1A (step-53). When the arrival of the rear body 1B at the HP is confirmed by the activation of the rear HP limit switch 37 (step-54), a stop instruction is outputted to the travel drive device 63B of the rear body 1B (step-55). Thereby, as shown in FIG. 13r, both of the front and rear bodies 1A and 1B return to the HP. In addition, before the activation of the front HP limit switch 27 for detecting the HP is confirmed, if the activation of the closing-direction deceleration confirmation limit switch 42 for deceleration purposes, which is an approach detecting means, is confirmed, a deceleration instruction is outputted to the travel drive device 63A of the front body 1A, and if the activation of the closed limit confirmation limit switch 43 for stop purposes is confirmed, a stop instruction is outputted to the travel drive device 63A of the front body 1A.

Figure 13S:

Subsequently, an opening instruction is outputted to the crossing gate 51 (step-56) to be ready for the next car washing. Thereby, as shown in FIG. 13s, the crossing gate 51 is opened to allow entry of the next vehicle 2.

In addition, when the getting-between confirmation sensors 47 are activated, that is, when a thing or a person is present between the front and rear bodies 1A and 1B, a stop instruction is outputted to each of the travel drive devices 63A and 63B of the front and rear bodies 1A and 1B. This prevents the thing or person from being nipped between the front and rear bodies 1A and 1B.

Thus, the car washing machine 1 is composed of the front and rear bodies 1A and 1B adapted to travel separately. When the front and rear bodies 1A and 1B are driven to travel separately, the distance between the washing means in operation and the drying means in operation, which are simultaneously executed, as shown in FIGS. 12j, 12k and 12l, can be set at the tracking distance L or more, thereby making it possible to prevent water splashes produced by washing from interfering with the drying, thus ensuring a satisfactory drying finish all the time.

Further, the cover 7 makes it possible to prevent water splashes from flying around through the clearance between the front and rear bodies 1A and 1B and to make the front and rear bodies 1A and 1B seem moving as a unit.

<Second Operation>

Whereas in the first operation described above, there is a state in which washing and drying are simultaneously executed, as shown in FIGS. 12j, 12k and 12l, it is possible, as a second operation, to perform the drying operation after completion of the washing operation, as shown in the operation explanatory views in FIGS. 14. The selection from these first and second operations can be made by inputting selection data into the control device 61.

The second operation will now be described with reference to the operation explanatory view in FIG. 14. Instruction signals to the various parts are outputted from the control device 61.

Figure 14A:
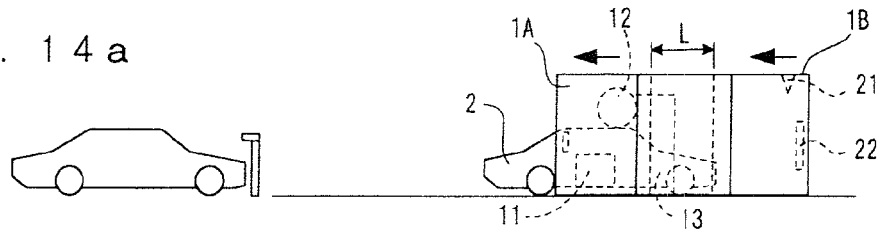
FIG. 14a–14g are explanatory views showing procedures, in order of occurrence, involved in a "second operation" control method for the car washing machine.

Since the washing operation applied to the vehicle 2 by the brushes 11, 12 and 13 in the first half of the second operation is the same as the operation shown in FIGS. 11a–11h and 12i in the first operation, a description thereof is omitted. The operation shown in FIG. 14a shows the state of the operation of FIG. 12i in the first operation, in which the washing of the vehicle 2 by the brushes 11, 12 and 13 is being executed. Further, the distance between the front and rear bodies 1A and 1B is defined as the tracking distance L.

Figure 14B:
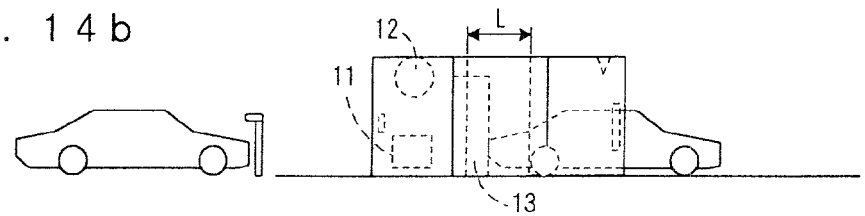

First, as shown in FIG. 14b, the side brushes 13 move around to the back of the vehicle 2 and are closed without activating the drying nozzles 21 and 22, the front and rear bodies 1A and 1B are stopped with the side brushes 13 positioned on the back of the vehicle 2.

Figure 14C:
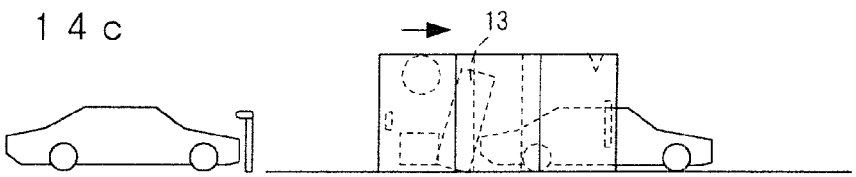

Then, as shown in FIG. 14c, front body 1A is moved backward and it stops when the side brushes 13 contact the rear end of the vehicle 2 and are tilted.

Figure 14D:
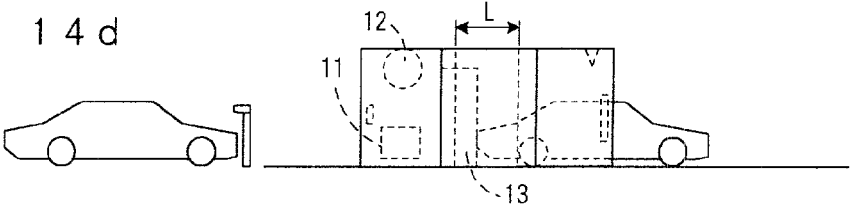

Then, as shown in FIG. 14d, the front body 1A is moved forward, and side brushes 13 are opened to wash the back of the vehicle 2. When the side brushes 13 are fully opened, the driving of the rocker brushes 11, top brush 12 and side brushes 13 is stopped and the front body 1A is stopped.

Figure 14E:
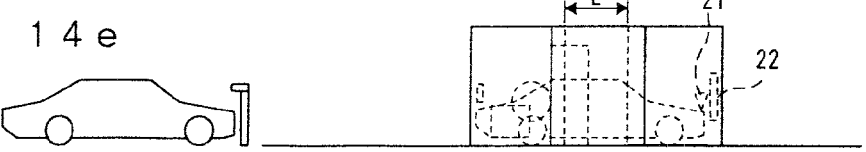

Subsequently, as shown in FIG. 14e, the front and rear bodies 1A and 1B are moved backward while maintaining the tracking distance L until the front end of the vehicle 2 comes directly below the top nozzle 21, whereupon the front and rear bodies 1A and 1B are stopped with the tracking distance L maintained. Subsequently, the blower devices 23 for the drying nozzles 21 and 22 are driven, the top nozzle 21 is lowered to the front end of the vehicle 2 and the drying of the upper surface and both side surfaces of the vehicle 2 by the drying nozzles 21 and 22 is started.

Figure 14F:

Subsequently, as shown in FIG. 14f, the rear body 1B is moved forward, the drying of the vehicle 2 by the drying nozzles 21 and 22 is executed, and when the activation of the closing-direction deceleration confirmation limit switch 42 for deceleration purposes is confirmed (when the rear body 1B approaches the front body 1A), the front body 1A is started to move forward and thus both of the front and rear bodies 1A and 1B are moved forward.

Figure 14G:
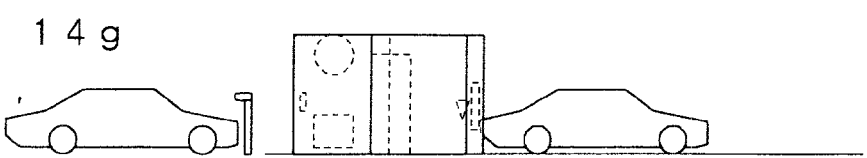
Figure 15A:
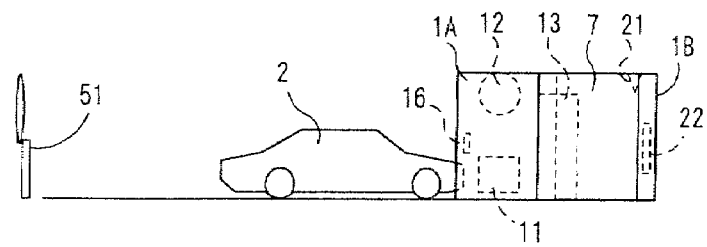
FIG. 15a–15e are explanatory views showing procedures, in order of occurrence, involved in a "third operation" control method for the car washing machine.
Figure 15B:
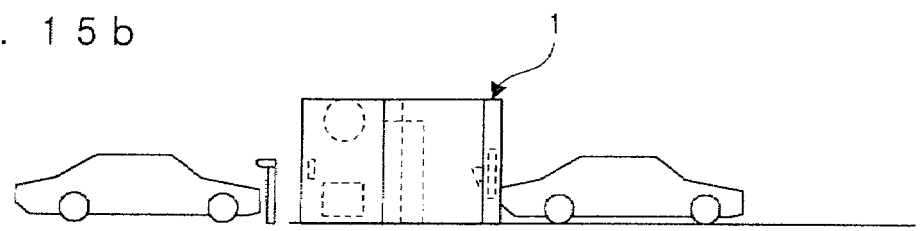
Figure 15C:
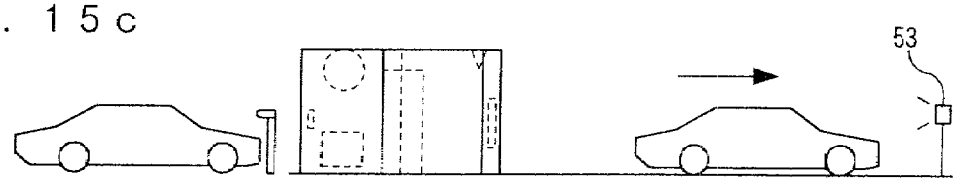
Figure 15D:
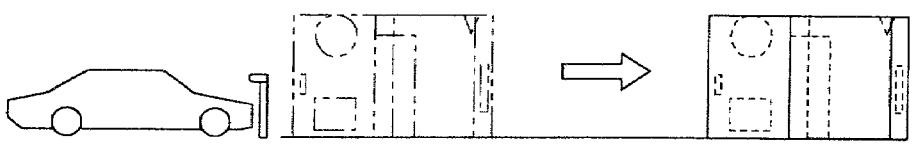
Figure 15E:

And, as shown in FIG. 14g, when reaching the OP, the front body 1A is stopped, and when reaching the OP, the rear body 1B is stopped. Subsequently, the driving of the drying nozzles 21 and 22 and blower devices 23 is stopped. In addition, the when the rear body 1B further approaches the front body 1A to activate the closed limit confirmation limit switch 43 for stop purposes, the rear body 1B is stopped.

Since the subsequent operation is the same as that shown in FIGS. 13q–13s for the first operation, a description thereof is omitted.

Thus, the drying operation is executed after completion of the washing operation, so that it is possible to eliminate the need for spacing the front and rear bodies 1A and 1B apart from each other during drying.

<Third Operation>

Whereas in the first operation, the front and rear bodies 1A and 1B are separately driven for travel, it is possible, as a third operation, to effect washing and drying while the front and rear bodies 1A and 1B travel as a unit, as shown in the operation explanatory view of FIG. 15.

The selection from these first, second and third operations can be made by inputting selection data into the control device 61.

In the third operation, the front and rear bodies 1A and 1B are activated as a unit, as described above. That is, the same signal (forward movement signal, stop signal or backward movement signal) is outputted simultaneously to the travel drive devices 63A and 63B of the front and rear bodies 1A and 1B.

As shown in FIG. 15, the front and rear bodies 1A and 1B move forward as a unit to execute the washing and drying operations. When the execution is completed with the vehicle 2 leaving the car shed, the front and rear bodies 1A and 1B have been moved backward to the HP. In the third operation, the washing time is greatly reduced as compared with the first and second operations.

Thus, in the third operation, the washing time is greatly reduced, so that the third operation may be employed when reduction of the washing time takes precedence over the finishing quality of drying, for example, when vehicles 2 form a line in front of the crossing gate 51; the selection of the third operation makes it possible to reduce the washing time and to reduce the waiting time of the drivers of the vehicles 2 waiting in front of the crossing gate 51.

Further, the third operation may be performed by comprising: advancing the front body 1A and the rear body 1B as a unit and spraying washing water or a detergent liquid to the vehicle 2 to execute washing of the vehicle; after this washing has been completed, moving backward the front body 1A and the rear body 1B as a unit and spraying a liquid wax to the vehicle 2 while activating the rocker brush 11, the top brush 12 and the side brush 13 to execute waxing; after this waxing has been completed, advancing again the front body 1A and the rear body 1B as a unit to execute drying; and after this drying has been completed and the vehicle 2 has left the washing machine, moving the front body 1A and the rear body 1B back to the HP.

<When Rear Pulse Encoder 40 Becomes Abnormal>

Figure 16:
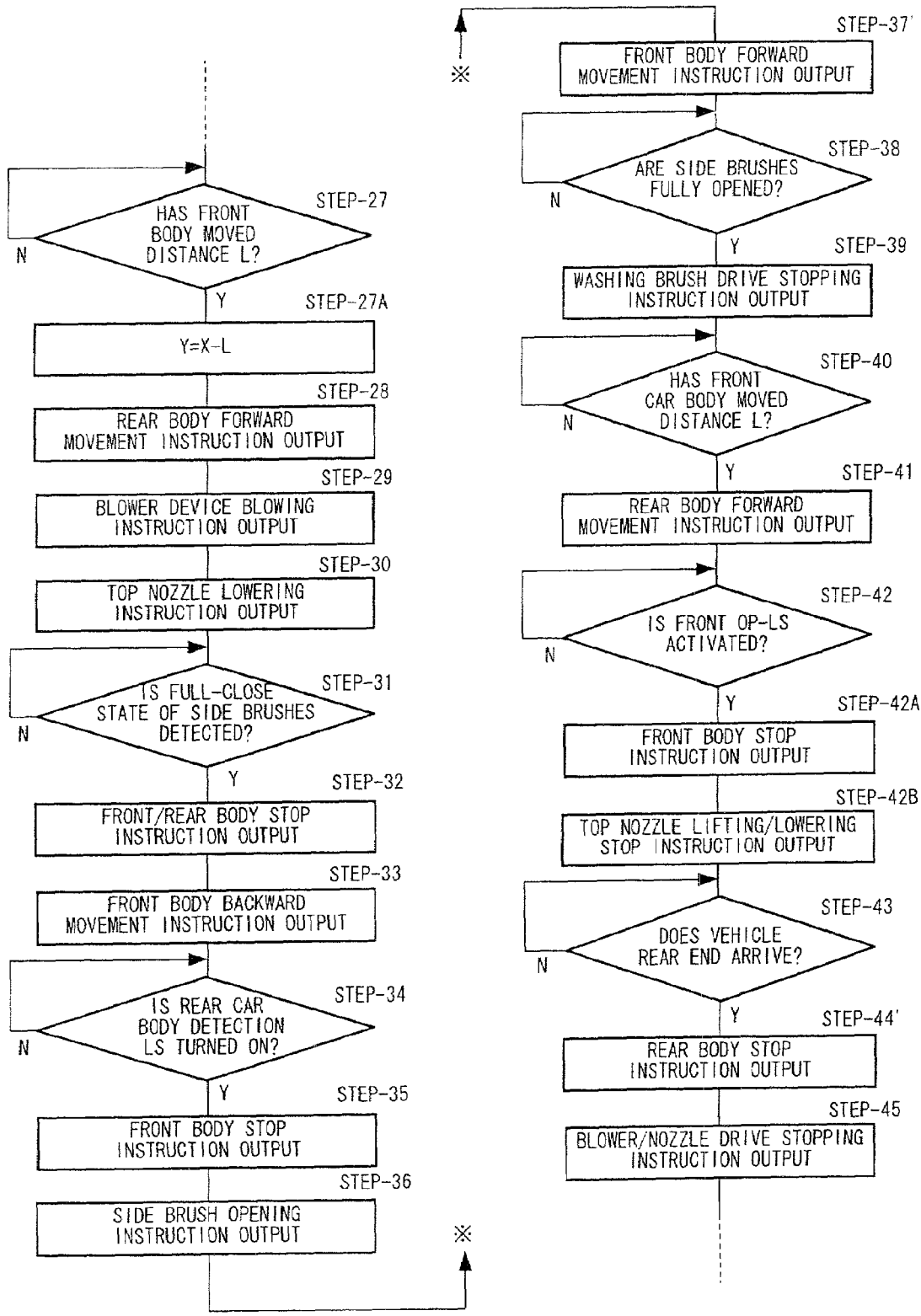
FIG. 16 is a flowchart showing procedures involved in a "rear pulse encoder abnormal time" control method for the car washing machine.

Next, in the first operation, a description will be given of an operation with reference to the flowchart of FIG. 16 and the operation explanatory view of FIG. 17, which operation takes place when in step-14 (FIG. 8) a travel instruction is outputted to the travel drive device 63B of the rear body 1B and a rear body travel signal is outputted to the rear pulse error detecting section 72 and a pulse error in the rear pulse encoder 40 is detected in the rear pulse error detecting section 72, that is, when the rear counter 67 cannot make normal detection of the traveled distance Y. In addition, it is assumed that the top brush 12 and top nozzle 21 are lifted and lowered according to the shape of the vehicle 2.

The operations in step-1-step-27 and step-45 et seq. are the same as in the first operation and a description thereof is omitted.

In step-27, when the tracking confirmation limit switch 45 is activated by the forward movement of the front body 1A, instead of the distance Y traveled by the rear body 1B outputted from the rear counter 67, the distance Y traveled by the rear body 1B is switched to the distance (Y=X−L), which is found by subtracting the tracking distance L from the distance X traveled by the front body 1A, (step-27A).

Figure 17A:
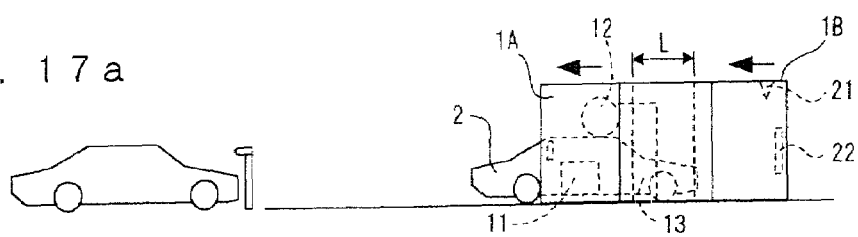
FIGS. 17a–17h are explanatory views showing the procedures involved in the "rear pulse encoder abnormal time" control method for the car washing machine.

And, a forward movement instruction is outputted to the travel drive device 63B of the rear body 1B (step-28). Thereby, as shown in FIG. 17a, with the tracking distance L maintained between the front and rear bodies 1A and 1B, the rear body 1B also starts forward movement. The distance Y traveled by the rear body 1B is found by subtracting the tracking distance L from the distance X traveled by the front body 1A, and top nozzle 21 is lifted and lowered on the basis of this traveled distance thus found.

Figure 17B:
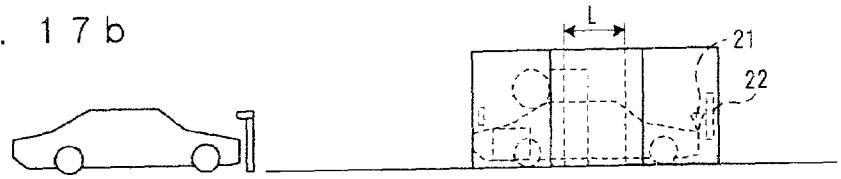
Figure 17C:
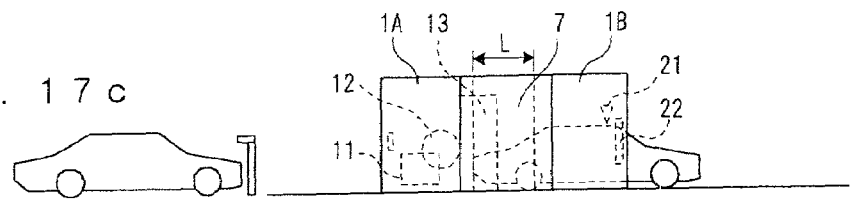

Subsequently, a blowing instruction is outputted to the blower devices 23 for the drying nozzles 21 and 22 (step-29), and a lowering instruction is outputted to the top nozzle 21 to lower to a level having an allowance for the bonnet height detected by the bonnet height detecting sensor 32 (step-30). Thereby, as shown in FIGS. 17b and 17c, the top nozzle 21 lowers to the front end of the vehicle 2 and the drying of the upper surface and both side surfaces of the vehicle 2 by the drying nozzles 21 and 22 is effected. At this time, the washing of the vehicle 2 by the brushes 11, 12 and 13 has been executed, and the distance between the brushes 11, 12, 13 and the drying nozzles 21, 22 is set at the tracking distance or more.

Figure 17D:
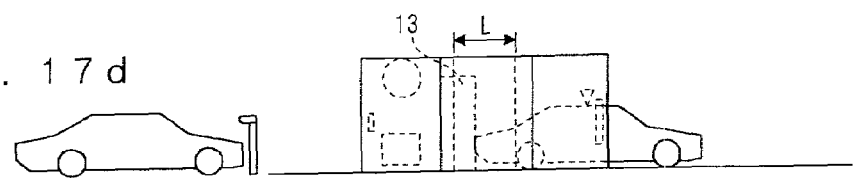

Subsequently, the washing of the side surfaces of the vehicle 2 by the side brushes 13 is completed, and when the side brushes 13 come around to the back of the vehicle 2 to activate the side brush full-close state detection limit switch 14 (step-31), a stop instruction is outputted to each of the travel drive devices 63A and 63B of the front and rear bodies 1A and 1B (step-32). Thereby, as shown in FIG. 17d, the front and rear bodies 1A and 1B stop with the side brushes 13 positioned on the back of the vehicle 2.

Then, a backward movement instruction is outputted to the travel drive device 63A of the front body 1A (step-33), and when the rear car body detection limit switch 34 is activated (step-34), a stop instruction is outputted to each of the travel drive devices 63A of the front body 1A (step-35) and an opening instruction is outputted to the side brushes 13 (step-36).

Figure 17E:
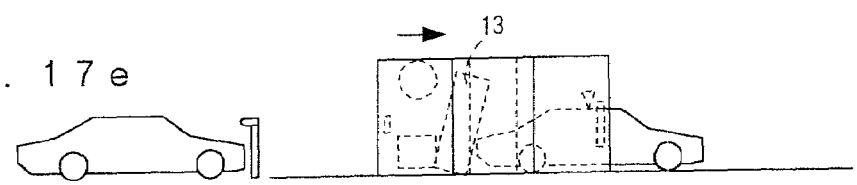

Thereby, as shown in FIG. 17e, the front body 1A is moved backward and it is stopped when the side brushes 13 contact the rear end of the vehicle 2 and are thereby tilted.

And, a forward movement instruction is outputted only to the travel drive device 63A of the front body 1A (step-37′). When the side brush full-open state detection limit switch 15 is activated (step-38), a drive stopping instruction is outputted to the brushes 11, 12 and 13 (step-39).

Figure 17F:
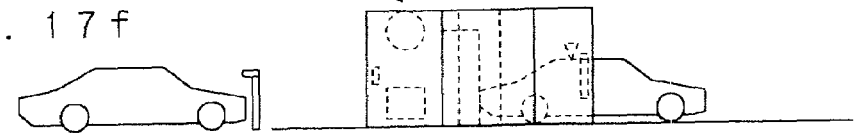

Thereby, as shown in FIG. 17f, the back of the vehicle 2 is washed by the side brushes 13 while the front body 1A is moving forward, and when the side brushes 13 become fully opened, the driving of the brushes 11, 12 and 13 is stopped.

Figure 17G:
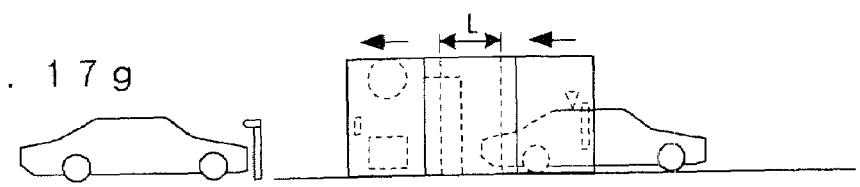

Subsequently, when the tracking confirmation limit switch 45 is activated by the forward movement of the front body 1A, (step-40), a forward movement instruction is outputted to the travel drive device 63B of the rear body 1B (step-41). Thereby, as shown in FIG. 17g, with the tracking distance L maintained between the front and rear bodies 1A and 1B, the rear boy 1B also starts moving forward. The distance Y traveled by the rear body 1B is found by adding the tracking distance L to the distance X traveled by the front body 1A. On the basis of traveled distance Y thus found, the top nozzle 21 is lifted.

And, when the front OP limit switch 27 is activated (step-42), a stop instruction is outputted to the travel drive device 63A of the front body 1A (step-42A), the lifting and lowering of the top nozzle 21 are locked to maintain it at its present height (step-42B). Thereby, the front body 1A is stopped and the height of the top nozzle 21 is maintained at its present height.

Figure 17H:
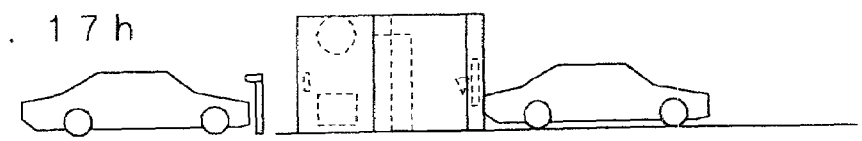

And, when arrival of the rear end of the rear body 1B at the rear end of the vehicle 2 is detected by the rear position detecting section 69 (step-43), a stop instruction is outputted to the travel drive device 63B of the rear body 1B (step-44'). Thereby, as shown in FIG. 17h, the rear body 1B is stopped with its rear end arriving at the rear end position of the vehicle 2. Thereafter, step-45 et seq. of the first operation are executed.

Thus, when a pulse error of the rear pulse encoder 40 is detected, that is, when it becomes impossible to detect the distance Y traveled by the rear body 1B, instead of the distance Y traveled by the rear body 1B outputted from the rear counter 67, the distance Y traveled by the rear body 1B is switched to the distance (Y=X−L), which is found by subtracting the tracking distance L from the distance X traveled by the front body 1A. Thereafter, the rear body 1B is moved forward/backward with the distance between the front and rear bodies 1A and 1B maintained equal to the tracking distance L. Further, the top nozzle 21 is driven according to the shape of the upper surface of the vehicle 2 on the basis of the distance X traveled by the front body 1A. Therefore, the vehicle 2 can be fully dried, and the drying operation can be prevented from stopping without being executed. Further, the distance between the washing means in operation and the drying means in operation can be set at the tracking distance L, thereby making it possible to prevent water splashes produced by washing from interfering with the drying, thus ensuring a satisfactory drying finish all the time. In addition, if it becomes impossible to keep the tracking distance L on the OP side, the lifting and lowering of the top nozzle 21 are locked to prevent the top nozzle 21 from contacting the vehicle 2.

Further, in an operation which has no relationship with the lifting and lowering of the top nozzle 21, it goes without saying that it is not necessary for the distance between the front and rear bodies 1A and 1B to be maintained equal to the tracking distance L. For example, as shown in FIGS. 17e and 17f, when the front body 1A is moved backward and forward after the back of the vehicle 2 has been washed by the side brushes 13 during the forward movement of the front body 1A, the distance between the front and rear bodies 1A and 1B is not maintained equal to the tracking distance L.

<When Front Pulse Encoder 36 Becomes Abnormal>

Figure 18:
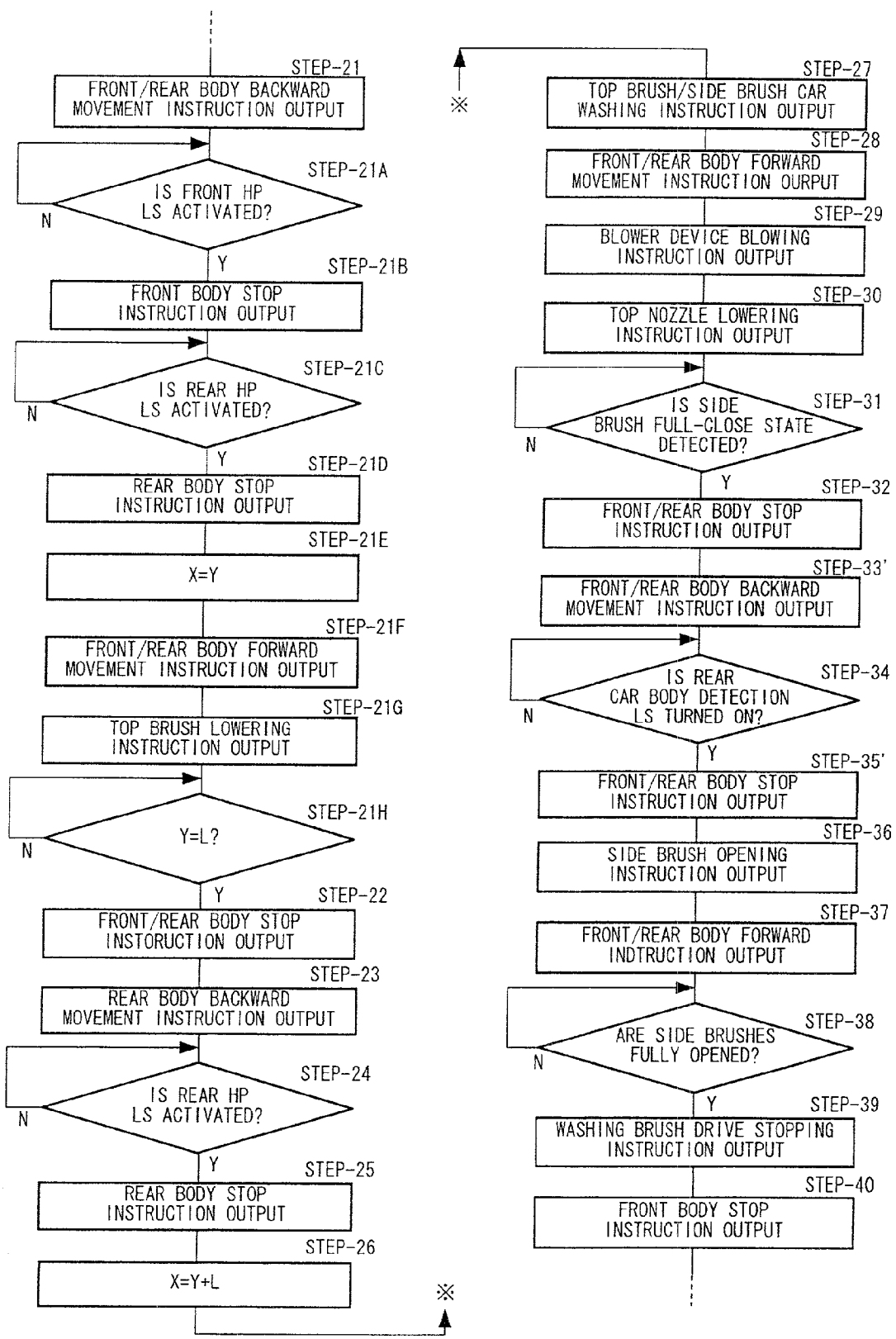
FIG. 18 is a flowchart showing procedures involved in a "front pulse encoder abnormal time" control method for the car washing machine.

Next, in the first operation, a description will be given of an operation with reference to the flowchart of FIG. 18 and the operation explanatory views of FIGS. 19 and 20, which operation takes place when in step-12 or step-17 (FIG. 8) a travel instruction is outputted to the travel drive device 63A of the front body 1A and a front body travel signal is outputted to the front pulse error detecting section 71 and a pulse error in the front pulse encoder 36 is detected in the front pulse error detecting section 71, that is, when the front counter 66 cannot make normal detection of the traveled distance X. In addition, it is assumed that the top brush 12 and top nozzle 21 are lifted and lowered according to the shape of the vehicle 2.

The operations in step-1-step-20 and step-41 et seq. are the same as in the first operation and a description thereof is omitted.

Figure 19A:
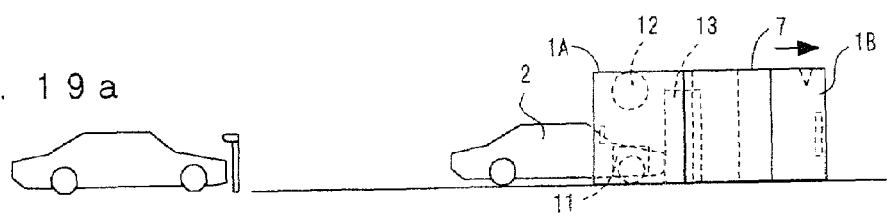
FIGS. 19a–19h and 20i–20k are explanatory views showing the procedures involved in the "front pulse encoder abnormal time" control method for the car washing machine.
Figure 19B:
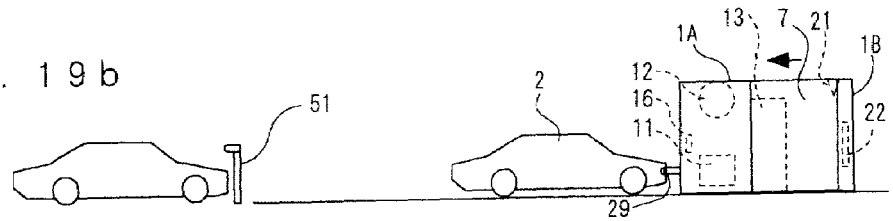

In step-20, an opening instruction is outputted to the side brushes 13, and the side brushes 13 contact the front surface of the vehicle 2, as shown in FIG. 19a, to wash the front surface of the vehicle 2, whereupon a backward movement instruction is outputted to each of the travel drive devices 63A and 63B of the front and rear bodies 1A and 1B (step-21). When the arrival of the front body 1A at the HP by the activation of the front HP limit switch 27 is confirmed (step-21A), a stop instruction is outputted to the travel drive device 63A of the front body 1A (step-21B), and when the arrival of the rear body 1B at the HP by the activation of the rear HP limit switch 37 is confirmed (step-21C), a stop instruction is outputted to the travel drive device 63B of the rear body 1B (step-21D). Thereby, as shown in FIG. 19b, the front and rear bodies 1A and 1B both return to their HPs.

Subsequently, instead of the distance X traveled by the front body 1A which is outputted from the front counter 66, the distance X traveled by the front body 1A is switched to the distance Y traveled by the rear body 1B (step-21E). Thereby, the traveled distance Y and the shape of the vehicle 2 from the car height data found by the car height sensor 26 are recognized.

Figure 19C:
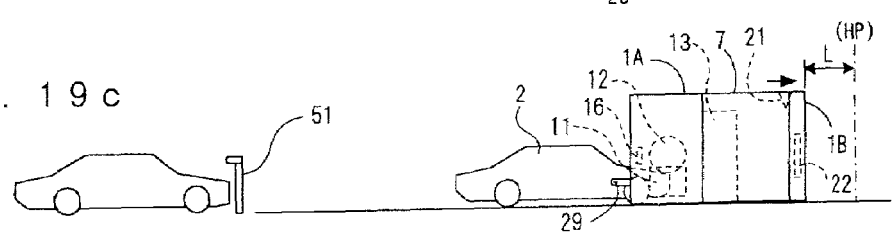

A forward movement instruction is outputted to each of the travel drive devices 63A and 63B of the front and rear bodies 1A and 1B (step-21F), and a lowering instruction is outputted to the top brush 12 to lower to a level having an allowance for the bonnet height detected by the bonnet height detecting sensor 32, that is, to lower to the vehicle front end position (step-21G). When the movement of the rear body 1B over the tracking distance L is confirmed by the distance Y traveled by the rear body 1B (step-21H), a stop instruction is outputted to each of the travel drive devices 63A and 63B of the front and rear bodies 1A and 1B (step-22). Thereby, as shown in FIG. 19c, the front and rear bodies 1A and 1B both travel forward over the distance L from their HPs and then are stopped, with the top brush 12 positioned on the vehicle 2.

Figure 19D:
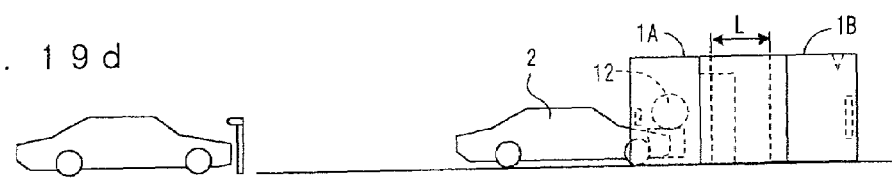

Subsequently, a backward movement instruction is outputted to the travel drive device 63B of the rear body 1B (step-23), and when the arrival of the rear body 1B at the HP is confirmed by the activation of the rear HP limit switch 37 (step-24), a stop instruction is outputted to the travel drive device 63B of the rear body 1B (step-25). Thereby, as shown in FIG. 19d, the rear body 1B returns to the HP with the distance between the front and rear bodies 1A and 1B maintained equal to the tracking distance L.

Subsequently, instead of the distance X traveled by the front body 1A which is outputted from the front counter 66, the distance X traveled by the front body 1A is switched to the distance (X=Y+L) which is found by adding the tracking distance L to the distance Y traveled by the rear body 1B (step-26). Thereby, the shape of the vehicle 2 is recognized by the traveled distance (Y+L) and by the car height data found by the car height sensor 26.

Figure 19E:
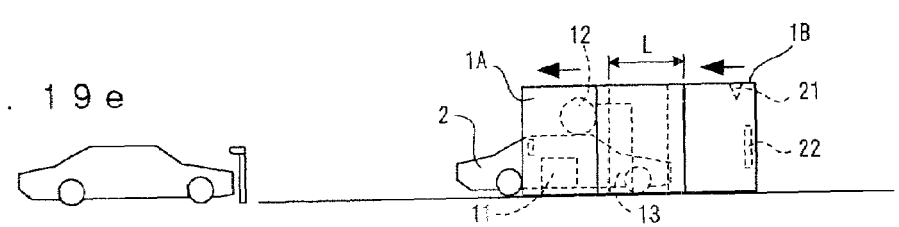

Subsequently, a car washing instruction signal is outputted to the top brush 12 and side brushes 13 (step-27), and a forward movement instruction is outputted to each of the travel drive devices 63A and 63B of the front and rear bodies 1A and 1B (step-28). Thereby, as shown in FIG. 19e, the front and rear bodies 1A and 1B move forward with the tracking distance L maintained while executing the washing of the upper surface and both side surfaces of the vehicle 2 by the top brush 12 and side brushes 13.

Figure 19F:
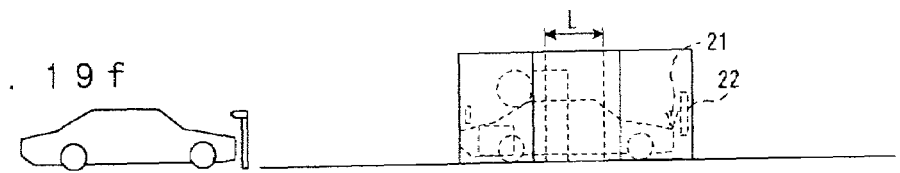
Figure 19G:
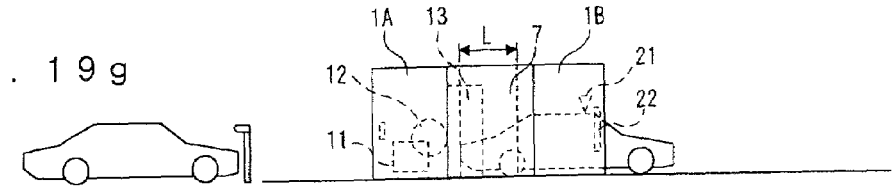

Subsequently, a blowing instruction is outputted to the blower devices 23 for the drying nozzles 21 and 22 (step-29), and a lowering instruction is outputted to the top nozzle 21 to lower to a level having an allowance for the bonnet height detected by the bonnet height detecting sensor 32 (step-30). Thereby, as shown in FIGS. 19f and 19g, the top nozzle 21 lowers to the front end of the vehicle 2, and the drying of the upper surface and both side surfaces of the vehicle 2 by the drying nozzles 21 and 22 is effected. At this time, the washing of the vehicle 2 by the brushes 11, 12 and 13 is being executed, and the distance between the brushes 11, 12, 13 and the drying nozzles 21, 22 is set at the tracking distance L or more.

Figure 19H:
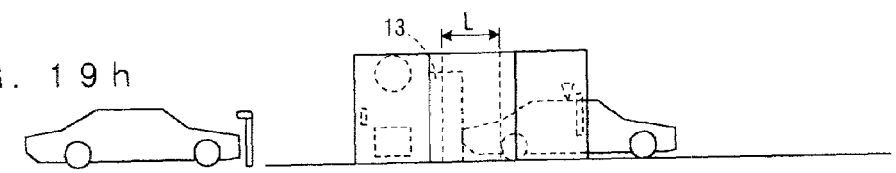

Subsequently, the washing of the side surfaces of the vehicle 2 by the side brushes 13 is completed, and when the side brushes 13 come around to the back of the vehicle 2 to activate the side brush full-close state detection limit switch 14 (step-31), a stop instruction is outputted to each of the travel drive devices 63A and 63B of the front and rear bodies 1A and 1B (step-32). Thereby, as shown in FIG. 19h, the front and rear bodies 1A and 1B stop with the side brushes 13 positioned on the back of the vehicle 2.

Figure 20I:
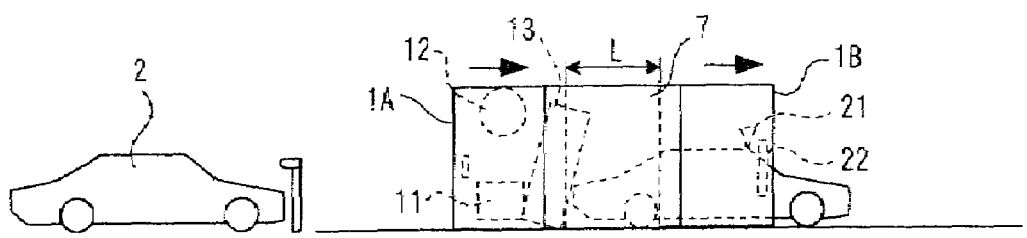
Figure 20J:
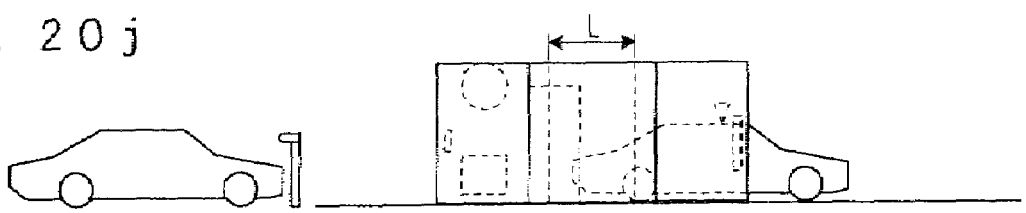
Figure 20K:
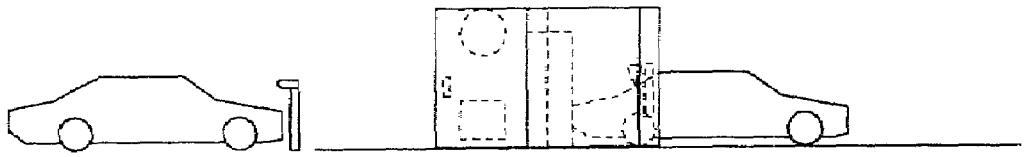

Then, a backward movement instruction is outputted to each of the travel drive devices 63A and 63B of the front and rear bodies 1A and 1B (step-33'). When the rear car body detecting limit switch 34 is activated (step-34), a stop instruction is outputted to the travel drive devices 63A and 63B of the front and rear bodies 1A and 1B (step-35') and an opening instruction is outputted to the side brushes 13 (step-36). And, a forward movement instruction is outputted to each of the travel drive devices 63A and 63B of the front and rear bodies 1A and 1B (step-37). When the side brush full-open state detection limit switch 15 is activated (step-38), a drive stopping instruction is outputted to each of the brush 11, 12 and 13 (step-39) and a stop instruction is outputted to the travel drive device 63A of the front body 1A (step-40). Thereby, as shown in FIG. 20i, the front and rear bodies 1A and 1B are moved backward with the tracking distance L maintained and it is stopped when the side brushes 13 contact the rear end of the vehicle 2 and are thereby tilted. Then, as shown in FIG. 20j, the front and rear bodies 1A and 1B continue moving forward while the vehicle 2 is washed at its back by the side brushes 13. When the side brushes 13 completely open, the driving of the brushes 11, 12 and 13 is stopped and the front body 1A is stopped. Further as shown in FIG. 20k, while the drying of the vehicle 2 by the drying nozzles 21 and 22 is being executed, the rear body 1B continues forward movement. Thereafter, step-41 et seq. in the first operation are executed.

Thus, when a pulse error in the front pulse encoder 36 is detected, that is, detection of the distance X traveled by the front body 1A become no longer possible, instead of the distance X traveled by the front body 1A which is outputted from the front counter 66, the distance X traveled by the front body 1A is switched to the distance Y traveled by the rear body 1B and then to the distance (X=Y+L) which is found by adding the tracking distance L to the distance Y traveled by the rear body 1B. Thereafter, the front body 1A is moved forward/backward with the distance between the front and rear bodies 1A and 1B maintained equal to the tracking distance L, and on the basis of the distance Y traveled by the rear body 1B, the brushes 11, 12 and 13 are driven according to the shape of the vehicle 2. Therefore, the vehicle 2 can be sufficiently washed and the washing operation can be prevented from stopping without being executed. Further, the distance between the washing means in operation and the drying means in operation can be set at the tracking distance L, thereby making it possible to prevent water splashes produced by washing from interfering with the drying, thus ensuring a satisfactory drying finish all the time.

Further, it goes without saying that it is not always necessary for the distance between the front and rear bodies 1A and 1B to be maintained equal to the tracking distance L. For example, as shown in FIGS. 19b and 19c, when the top brush 12 is lowered to the front end of the vehicle 2 while the front and rear bodies 1A and 1B are moved forward as a unit, the distance between the front and rear bodies 1A and 1B is not maintained equal to the tracking distance L.

In addition, in this embodiment, a cover 7 is installed such that the front and rear bodies 1A and 1B may seem to be integral with each other when they are spaced apart and such that it covers the spacing. However, as shown in FIG. 21, a cover 7' may be attached to the interior of the front body 1A. At this time, the getting-between confirmation sensor 47 is installed outside the cover. Further, as a covering means, the cove 7 may be replaced by a bellows (construction). Further, the cover 7 may be attached to the interior of the rear body 1B.

Figure 22A:
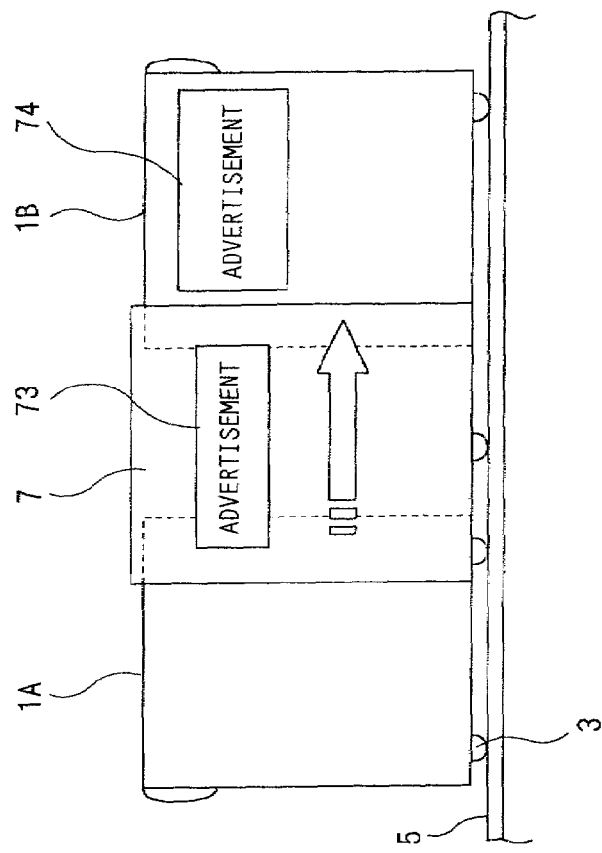
FIGS. 22a–22b are schematic side views of a car washing machine according to another embodiment of the invention.
Figure 22B:
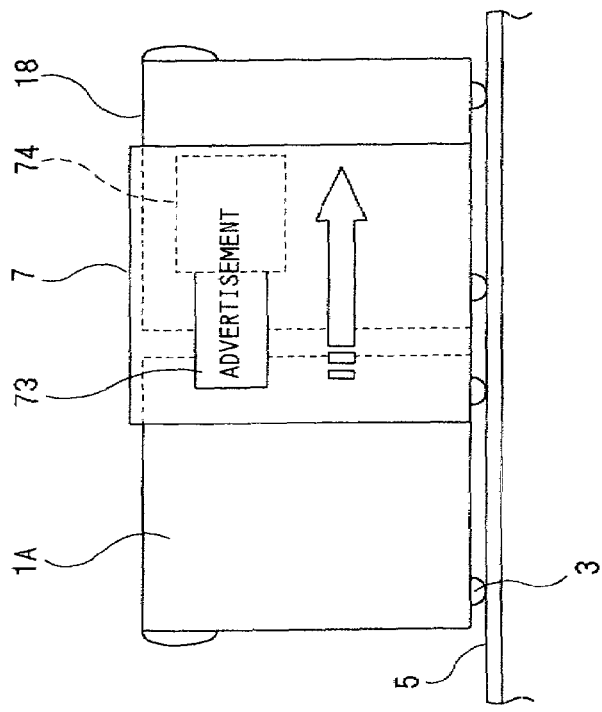

Further, as shown in FIG. 22, an advertisement 73 may be mounted on the side surface of the cover 7 to serve as a display means. Further, an advertisement 74 may be mounted to serve as a display means on the side surface of the rear body 1B which is hidden behind the cover 7 when the front and rear bodies 1A and 1B are close to each other. Such advertisement may be replaced by a design or characters.

Further, in the present embodiment, the front end of the cover 7 is fixed to the front body 1A; however, it may be fixed to the rear body 1B. In that case, the advertisement 74 is mounted to serve as a display means on the side surface of the front body 1A which is hidden behind the cover 7 when the front and rear bodies 1A and 1B are close to each other.

Further, in the present embodiment, the front body 1A is provide with the washing means while the rear body 1B is provide with the drying means. However, the front and rear bodies 1A and 1B may each be provided with a car washing means for the vehicle 2 consisting of a washing means and a drying means. The car washing means of the front body 1A can be driven on the basis of the distance X traveled by the front body 1A which is outputted from the front counter 66, while the car washing means of the rear body 1B can driven on the basis of the distance Y traveled by the rear body 1B which is outputted from the rear counter 67.

Further, when a pulse error in the rear pulse encoder 40 is detected, that is, when the distance Y traveled by the rear body 1B cannot be detected, the "car washing means" of the rear body 1B is driven on the basis of the distance X traveled by the front body 1A instead of the distance Y traveled by the rear body 1B which is outputted from the rear counter 67, while when a pulse error in the front pulse encoder 36 is detected, that is, when the distance X traveled by the front body 1A cannot be detected, the "car washing means" of the front body 1A is driven on the basis of the distance Y traveled by the rear body 1B instead of the distance X traveled by the front body 1A which is outputted from the front counter 66. At this time, when the top brush 12 and top nozzle 21 are lifted and lowered according to the shape of the vehicle 2, the distance (spacing) between the front and rear bodies 1A and 1B is maintained equal to a given tracking distance L according to the activation of the tracking confirmation limit switch 45.

Figure 23:
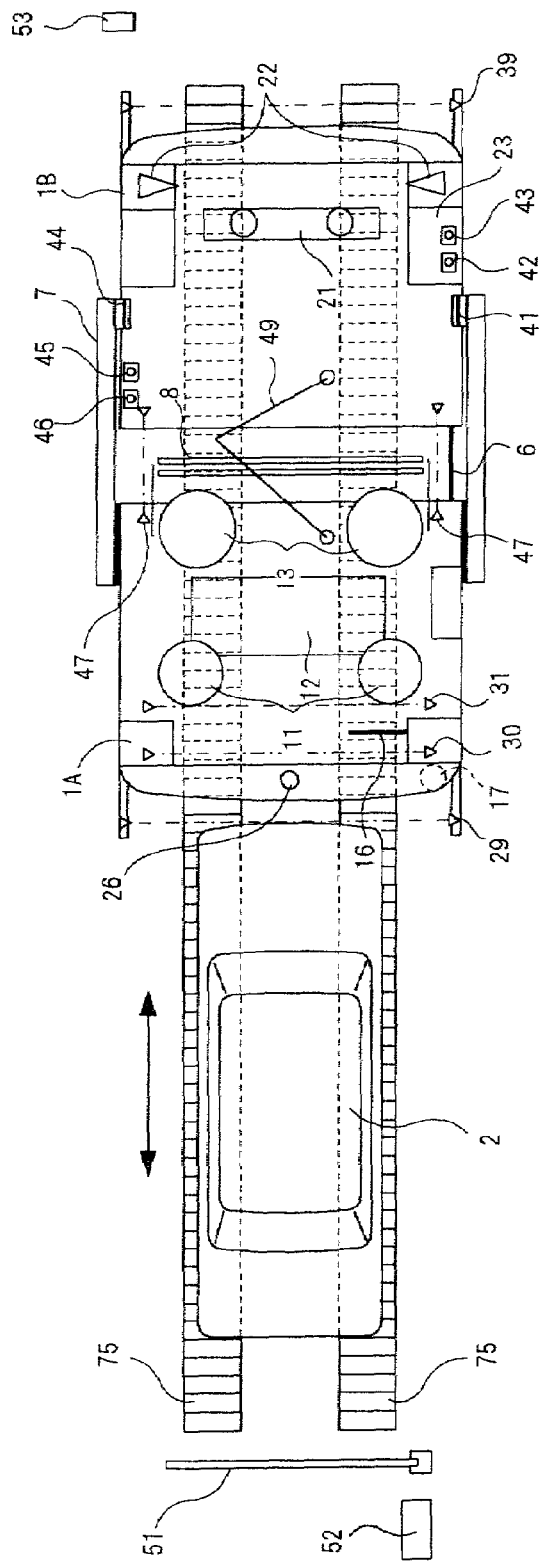
FIG. 23 is a schematic plan view of a car washing machine according to another embodiment of the invention.

Further, in the present embodiment, the washing of the vehicle 2 is effected by moving the car washing machine 1 (front and rear bodies 1A and 1B) alone; however, the front and rear bodies 1A and 1B may be moved toward and away from each other or the vehicle 2 may be moved back and forth by using a roller conveyor 75 (an example of a vehicle moving means) as shown in FIG. 23. Thus, the washing of the vehicle 2 by the car washing machine 1 is effected while the car washing machine 1 and the vehicle 2 are relatively moving to pass by each other, thereby making it possible to shorten the distance to be traveled by the car washing machine 1 and to thereby reduce the installation space for the car washing machine, thus realizing space saving.

Figure 24:
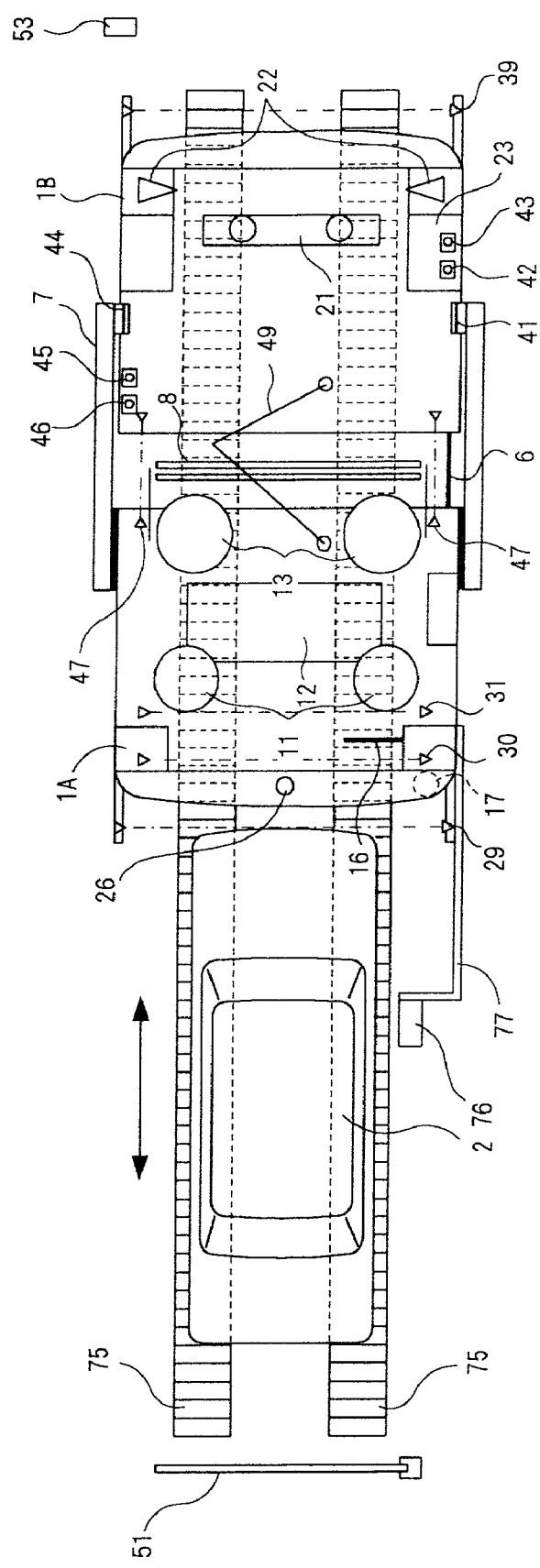
FIG. 24 is a schematic plan view of a car washing machine according to another embodiment of the invention.

Further, in the present embodiment, the crossing gate 51 and remote panel 52 are disposed in front of the front ends of the traveling rails 5; however, as shown in FIG. 24, a remote panel 76 which has the same functions as those of the remote panel 52 may be attached to the car washing machine 1 (front body 1A) through an arm 77. According to this arrangement, the installation space for the entire car washing machine including the crossing gate 51 can be reduced, ensuring efficient use of the space.

Further, in the present embodiment, the tracking distance L is taken to be the largest possible spacing distance; however, it is not limited to the largest possible spacing distance, and it may be set within the range of the length of a wire 6 which connects the front and rear bodies 1A and 1B.

Further, in the present embodiment, the wire 6 is used as a cable for connecting the front and rear bodies 1A and 1B for movement toward and away from each other; however, not limited to such wire, the cable may be a chain or the like.

Further, in the present embodiment, the detecting means for detecting the positional relationship between the front and rear bodies 1A and 1B is composed of the to-be-detected bodies 41, 44, the closing-direction deceleration confirmation limit switch 42 for deceleration purposes, the closed limit confirmation limit switch 43 for stop purposes, the tracking confirmation limit switch 45 for tracking purposes, and the terminal end limit (opened limit) confirmation limit switch 46 for stop purposes; however, the detecting means may be composed of other sensors, such as ultrasonic sensors, proximity sensors or photoelectric sensors.

What is claimed is:

1. A car washing machine for washing a vehicle, while moving a body of the car washing machine, characterized in that
    said body of the car washing machine comprises a front body and a rear body, each being capable of separately traveling,
    said front body is provided with a washing means for washing said vehicle,
    said rear body is provided with a drying means for drying said vehicle, and
    a cover is installed for covering a lateral side of a gap portion between said front body and said rear body to prevent water from splashing out from the gap portion, the gap portion being produced when said bodies travel to separate from each other, wherein
    one end of said cover is fixed to one of said front and rear bodies, and the other end of said cover is arranged to be slidable on the other of said front and rear bodies.

2. A car washing machine as set forth in claim 1, characterized in that at least one of an advertisement, a design and a character is displayed on a lateral side of one of said front and rear bodies, when said front and rear bodies travel to separate from each other and said lateral side comes outside of a covering range of said cover.

3. A car washing machine as set forth in claim 2, characterized in that
    a spacing detection means is installed which is activated when the said front and rear bodies are spaced apart a given distance,
    said front body is provided with a front body travel detection means for detecting a distance traveled by said front body, and said car washing means operates to wash said vehicle based on the traveled distance detected by said front body travel detection means,
    said rear body is provided with a rear body travel detection means for detecting a distance traveled by said rear body, and said car drying means operates to dry said vehicle based on the traveled distance detected by said rear body travel detection means, and
    when the distance traveled by said front body or said rear body can no longer be detected by the travel detection means of said front body or said rear body, a spacing between said front and rear bodies is maintained at a given value in response to the activation of said spacing detection means, and said washing means of said front body and said drying means of said rear body are driven based on the traveled distance detected by the travel detection means of said front body or said rear body, the travel detection means operating normally without causing any trouble.

4. A car washing machine as set forth in claim 3, characterized in that said spacing detection means detects that said front and rear bodies are spaced apart a given distance, from a moved position of said covering means.

5. A car washing machine as set forth in claim 1, characterized in that
    a spacing detection means is installed which is activated when the said front and rear bodies are spaced apart a given distance,
    said front body is provided with a front body travel detection means for detecting a distance traveled by said front body, and said car washing means operates to wash said vehicle based on the traveled distance detected by said front body travel detection means,
    said rear body is provided with a rear body travel detection means for detecting a distance traveled by said rear body, and said car drying means operates to dry said vehicle based on the traveled distance detected by said rear body travel detection means, and
    when the distance traveled by said front body or said rear body can no longer be detected by the travel detection means of said front body or said rear body, a spacing between said front and rear bodies is maintained at a given value in response to the activation of said spacing detection means, and said washing means of said front body and said drying means of said rear body are driven based on the traveled distance detected by the travel detection means of said front body or said rear body, the travel detection means operating normally without causing any trouble.

6. A car washing machine as set forth in claim 5, characterized in that said spacing detection means detects that said front and rear bodies are spaced apart a given distance, from a moved position of said covering means.

* * * * *